United States Patent [19]

Minoura

[11] 4,108,532
[45] Aug. 22, 1978

[54] LIGHT BEAM SCANNING DEVICE

[75] Inventor: Kazuo Minoura, Yokohama, Japan

[73] Assignee: Canon Kabushiki Kaisha, Tokyo, Japan

[21] Appl. No.: 807,744

[22] Filed: Jun. 17, 1977

[30] Foreign Application Priority Data

Jun. 23, 1976 [JP] Japan .................................. 51-74028
Sep. 10, 1976 [JP] Japan ................................ 51-108567
May 20, 1977 [JP] Japan .................................. 52-59158

[51] Int. Cl.² .......................................... G02B 27/17
[52] U.S. Cl. ..................................... 350/6.6; 346/108; 350/226; 350/232; 358/199
[58] Field of Search ................ 350/6; 346/108; 354/5; 358/199

[56] References Cited

U.S. PATENT DOCUMENTS

| | | | |
|---|---|---|---|
| 3,345,120 | 10/1967 | Palmer | 350/6 |
| 3,573,849 | 4/1971 | Herriot | 346/108 |
| 3,687,025 | 8/1972 | Rosin | 354/5 |
| 3,719,780 | 3/1973 | Gazard et al. | 350/6 |

FOREIGN PATENT DOCUMENTS 1,428,970  3/1976  United Kingdom .................. 350/6

Primary Examiner—John K. Corbin
Assistant Examiner—B. Wm. delos Reyes
Attorney, Agent, or Firm—Fitzpatrick, Cella, Harper & Scinto

[57] ABSTRACT

This specification discloses a light beam scanning device in which a light spot is moved at a uniform velocity on a surface to be scanned. The light beam scanning device comprises a light source, a vibratory mirror and a focusing lens system. The vibratory mirror has its rotational angle ($\phi$) vibrated at $\phi_o \sin k_1 t$, and the light source is disposed at a location spaced apart by a distance $r$ with respect to the center of the vibratory mirror. The focusing lens has a distortion characteristic expressed as:

$$y' = \frac{fr\phi_o}{r+l} \quad F(\theta)d\theta$$

where $y'$ represents the image height, $l$ is the distance between the center of the vibratory mirror and the nodal point of the focusing lens on the entrance side thereof, $F(\theta)$ equals $$\frac{l^2 + r^2 + 2l \cdot f(\theta)}{\{r + l \cdot f(\theta)\} \sqrt{\phi_o^2 - \left[\arccos\left\{\frac{1}{r}f(\theta)\right\}\right]^2}}$$

where $f(\theta)$ equals $\sqrt{r^2\cos^2\theta - l^2\sin^2\theta} - l\sin^2\theta$, and $\theta$ represents the angle formed between the scanning beam directed toward the entrance side nodal point of the focusing lens and the optic axis of the focusing lens.

9 Claims, 70 Drawing Figures

― e'=0.015
----- e'=0.05
―・― e'=0.1
―・・― e'=0.2

FIG. 10 ($\phi_0=20°$)

FIG. 12 ($\phi_0=20°$)

FIG. 13 ($\phi_0 = 20°$)

FIG. 16($\phi_0$=20°)

FIG. 17 ($\phi_0 = 20°$)

FIG. 21 ($\phi_a=15°$)

FIG. 24 ($\phi_0 = 15°$)

FIG. 26 ($\phi_0=15°$)

FIG. 28 ($\phi_0 = 10°$)

FIG. 29 ($\phi_0=10°$)

FIG. 32 ($\phi_0 = 10°$)

FIG. 37

LIGHT BEAM SCANNING DEVICE

BACKGROUND OF THE INVENTION

1. Field of the Invention

This invention relates to a scanning optical system, and more particularly to a scanning optical system using a sine vibration mirror.

2. Description of the Prior Art

The sine vibration mirror herein used refers to a mirror having a rotational angle $\phi$ which may be expressed with respect to time $t$ as follows:

$$\phi = \phi_o \cdot \sin k_1 \cdot t \qquad (1),$$

the rotational angle $\phi$ being the angle through which the mirror is rotated with respect to its reference position in which the reflected light resulting from the light beam from a light source to the center of the mirror being reflected by the mirror is coincident with the optic axis of the focusing lens. A typical example of such sine vibration mirror is the high-speed galvanomirror. If the galvanomirror is to be vibrated at high speed, a high frequency current must be flowed to the coil of the galvanomirror. If it is desired to make the vibration of the galvanomirror linear, this may be accomplished by flowing a saw-tooth high frequency current to the coil, whereas a saw-tooth high frequency current is difficult to obtain and therefore, a sine form high frequency current which is readily available is usually flowed to the coil. When such sine form high frequency current is flowed to the coil, the vibration of the mirror assumes a sine form.

The vibration velocity of the scanning beam of the scanning optical system using such a sine vibration mirror is necessarily a non-equiangular velocity. Accordingly, the movement of the scanning beam on the scanned surface becomes non-linear. The scanning system in which the movement of the scanning beam on the scanned surface is non-linear has been inconvenient for application to the so-called laser beam printer in which a laser beam is modulated in accordance with equally intervaled signals and the modulated laser beam is caused to scan the recording surface by a scanning system to thereby record information on the recording surface or for application to the so-called bar gauge in which an object to be inspected is disposed within the amplitude of the vibration of the scanning beam so that the time during which the scanning beam is interrupted by the object is measured to thereby measure the length of the object. On such a ground, a technique is well-known for long in which a distortion lens is disposed between the mirror in a scanning system capable of providing a scanning beam of non-equiangular velocity and the surface to be scanned so that the movement of the scanning beam on the scanned surface is linearly corrected by the distortion lens. For example, U.S. Pat. No. 2,692,369 issued on Oct. 19, 1954 discloses a device using a distortion lens to correct the non-linearity of the scanning beam caused by a light cam.

Also, U.S. Pat. No. 3,573,849 issued on Apr. 6, 1971, U.S. Pat. No. 3,687,025 issued on Aug. 19, 1972 and U.S. Pat. No. 3,345,120 issued on Oct. 3, 1967 disclose devices using a $y_2/\theta$ distortion lens to correct the non-linearity of the scanning beam caused by a deflecting-reflecting surface of equiangular velocity.

The present invention applies such technique to a scanning optical system including a mirror vibrated in a sine form.

SUMMARY OF THE INVENTION

It is therefore an object of the present invention to provide a scanning optical system including a mirror vibrated in a sine form which is capable of providing uniform movement of the scanning beam on a surface to be scanned.

Such an object is achieved by disposing a focusing lens having a distortion characteristic matching the characteristic of the mirror vibrated in a sine form between the vibratory mirror and the surface to be scanned.

The invention will become more fully apparent from the following detailed description thereof taken in conjunction with the accompanying drawings.

BRIEF DESCRIPTION OF THE DRAWINGS

Figure 37:
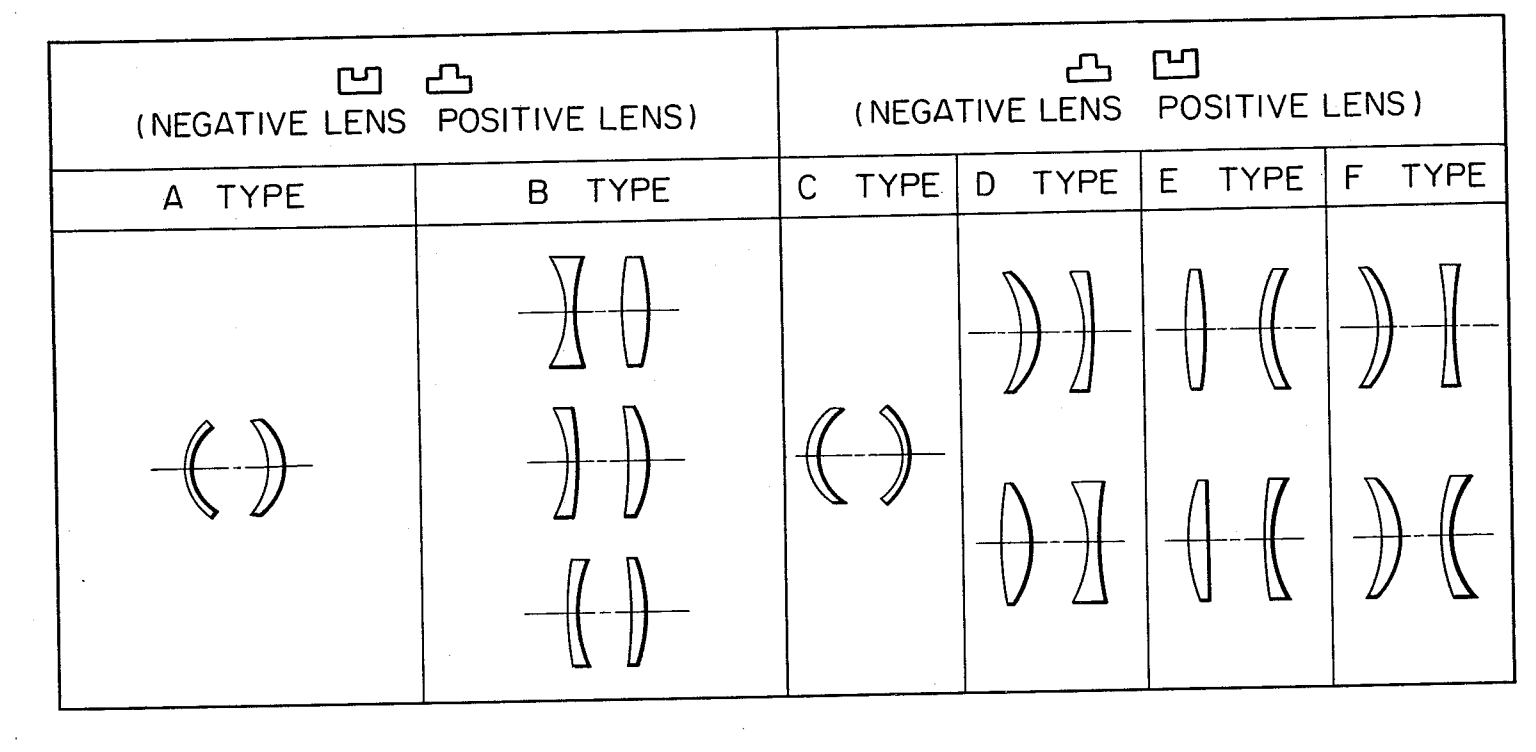

FIG. 37 shows the types of the focusing lens for scanning available for the information processing terminal unit.

DESCRIPTION OF THE PREFERRED EMBODIMENTS

Figure 1:
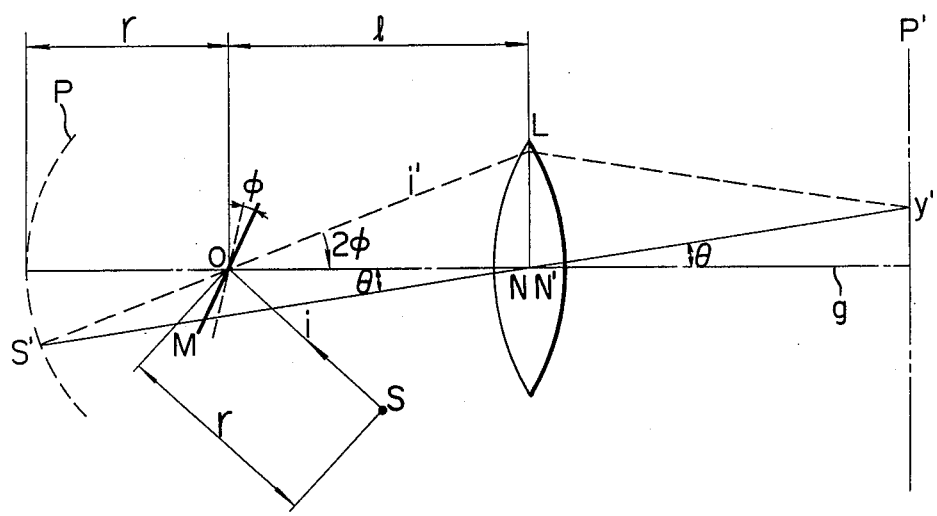
FIG. 1 schematically shows the optical arrangement of a first embodiment of the scanning optical system according to the present invention.

Referring to FIG. 1 which shows the arrrangement of the scanning optical system according to the present invention, reference character S designates a light source disposed at a location spaced apart by a distance $r$ with respect to the center O of a mirror M vibrated in a sine form. Designated by $i$ is a light beam directed from the light source S toward the center O of the mirror M, $i'$ a light beam reflected by the mirror M, L a focusing lens, $g$ the optic axis of the focusing lens, and P' the image plane of the focusing lens. Let $\phi$ be the rotational angle through which the mirror M is rotated, as indicated by broken line, with respect to its reference position in which the reflected light beam $i'$ coincides with the optic axis of the focusing lens L. As already described, the rotational angle $\phi$ is in the following relationship with time $t$:

$$\phi = \phi_o \cdot \sin k_1 \cdot t \tag{1}$$

Let $\omega$ be the angular velocity $(d\phi/dt)$ of the mirror. By the use of equation (1), $\omega$ may be expressed as:

$$\omega \equiv \frac{d\phi}{dt} = k_1 \phi_0 \cos k_1 \cdot t = \pm k_1 \sqrt{\phi_0^2 - \phi^2} \tag{2}$$

where $\phi_o$ is the maximum angle of deviation and assumes the plus sign (+) when $(\pi/R_1)(2m - \frac{1}{2}) \leq t \leq (\pi/k_1)(2m + \frac{1}{2})$ and assumes the minus sign (−) when $(\pi/k_1)(2m + \frac{1}{2}) < t < (\pi/k_1)(2m + 3/2)$.

If the distance between the center O of the mirror M and the nordal point N of the lens L on the entrance side thereof is $l$, the incident light beam $i$ may be regarded as if it were reflected by the mirror M and the reflected light beam $i'$ may be regarded as if it were emergent from a point S' on an arc P which has its center of curvature at the center O of the mirror. Let $\theta$ be the angle formed between the straight line passing through the point S' to the nordal point N of the lens L on the entrance side thereof and the optic axis $g$. Between $\theta$ and $\phi$, there is the following relation:

$$\tan\theta = r \sin 2\phi / (l + r \cos 2\phi) \tag{3}$$

By differentiating both sides of equation (3) by time $t$, the following is obtained:

$$\frac{d\theta}{dt} = \frac{2r(r + l\cos 2\phi)}{l^2 + r^2 + 2lr\cos 2\phi} \cdot \frac{d\phi}{dt} \tag{4}$$

$$= \pm \frac{2k_1 \cdot r(r + l\cos 2\phi)}{l^2 + r^2 + 2lr\cos 2\phi} \sqrt{\phi_0^2 - \phi^2}$$

On the other hand, if it is required that the absolute value of the scanning velocity of the image point $y'$ on the image plane P' of the lens L be constant, $$(dy'/dt) = \pm k_2 (=\text{const.}) \tag{5}$$

From equations (3), (4) and (5), the following is derived:

$$\frac{dy'}{d\theta} = \frac{k_2}{2k_1} \cdot \frac{l^2 + r^2 + 2lr\cos 2\phi}{r(r + l\cos 2\phi)\sqrt{\phi_0^2 - \phi^2}} \tag{6}$$

$$= \frac{k_2}{2k_1} \cdot F(\theta) \tag{6'}$$

where $$F(\theta) \equiv \frac{l^2 + r^2 + 2l \cdot f(\theta)}{\{r + l \cdot f(\theta)\} \sqrt{\phi_0^2 - [\arccos\{\frac{1}{r}f(\theta)\}]^2}} \tag{7}$$

$$F(\theta) \equiv \sqrt{r^2\cos^2\phi - l^2\sin^2\theta} - l\sin^2\theta \tag{8}$$

From equation (6), the image point $y'$ is:

$$y' = \frac{k_2}{2k_1} \int F(\theta) d\theta \tag{9}$$

However, the integration constant is omitted from the above equation because it is zero if it is assumed that $y' = 0$ when $\theta = 0$. Here, when $\theta$, is minute, namely, in the paraxial range, with $f$ as the paraxial focal length of the lens, the following is derived from equation (6):

$$\frac{dy'}{d\theta} = \frac{k_2}{2k_1} \cdot \frac{r + l}{r\phi_0}$$

On the other hand, in the paraxial range, $$y' = f \cdot \theta$$

is also established and hence, the following equation must be established:

$$k_2 = \frac{2rk_1\phi_o}{r + l} \cdot f \tag{10}$$

That is, if the lens L is made to have a special distortion characteristic such that equations (7), (8) and (9) are established, the scanning speed on the focusing surface has the constant value as shown by equation (10) above. In contrast, when a conventional lens, namely, a lens as represented by $$y' = f \tan\theta \tag{11}$$

is used in a scanning system employing a sine vibration mirror, the following is obtained from equations (3), (4) and (11):

$$\left| \frac{dy'}{dt} \right| = f \cdot \frac{1}{\cos^2\theta} \cdot \left| \frac{d\theta}{dt} \right|$$

$$= 2k_1 f \frac{[l^2 + l \cdot f(\theta)]}{[L + f(\theta)]^2} \sqrt{\theta_o^2 - [\arccos\{\frac{1}{r}f(\theta)\}]^2}$$

where $f(\theta)$ is given by equation (8).

As seen from the above equation, $|dy'/dt|$, namely, the absolute value of the scanning speed on the focusing surface is not a constant value.

Figure 2:
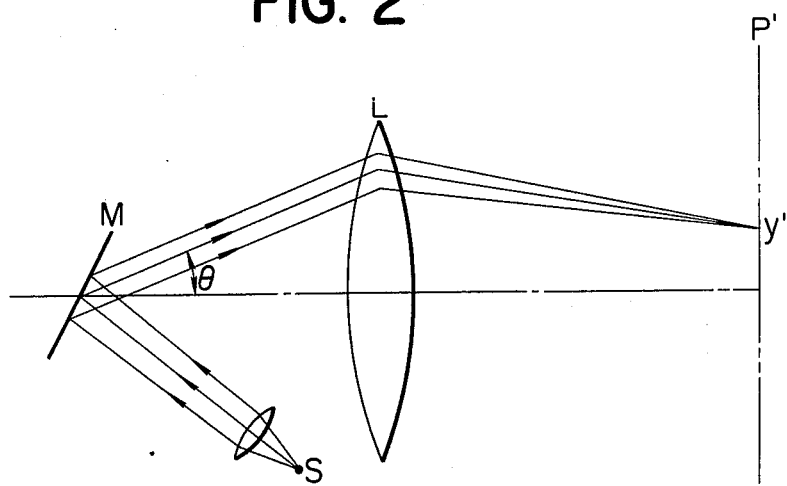
FIG. 2 schematically shows the optical arrangement of a second embodiment in which the light source is at infinity.
Figure 3:
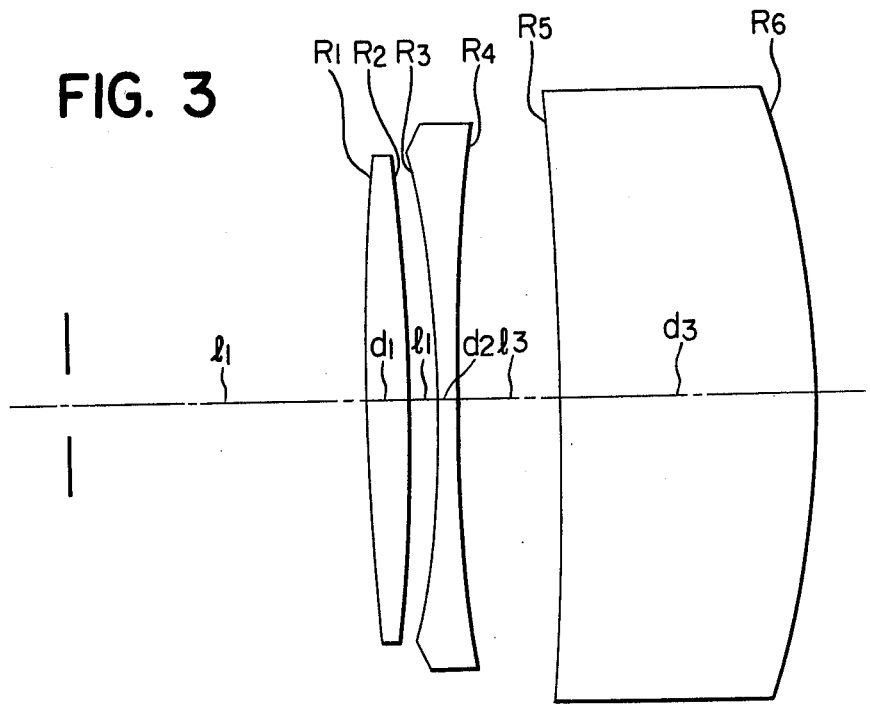
FIG. 3 is a cross-sectional view of a lens designed to have a distortion characteristic as represented by equation (12) appearing hereinafter.
Figure 4:
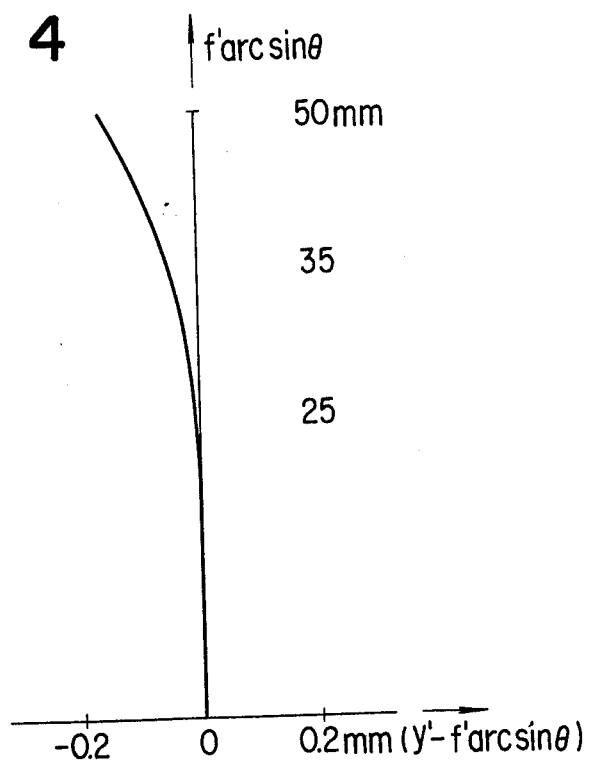
FIGS. 4 and 5 illustrate the distortion characteristics of the lenses indicated in Tables 1 and 2 hereinafter and show the amounts of deviation of the focus position from the ideal image height.
Figure 5:
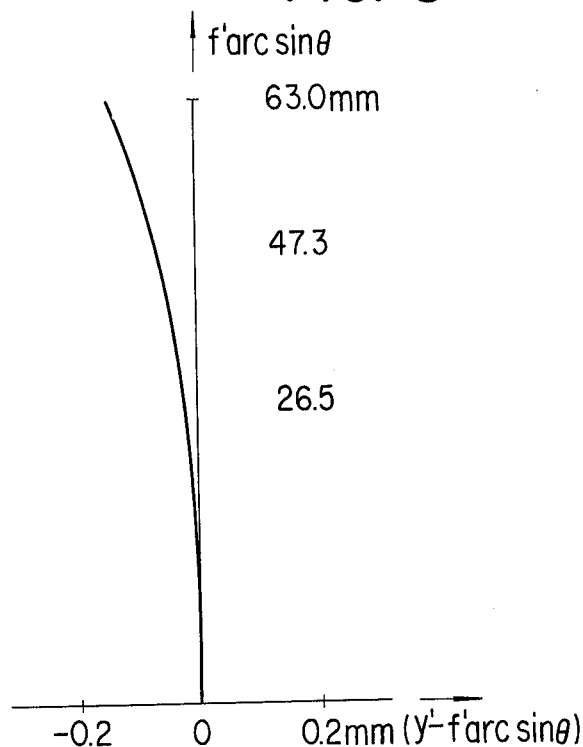

In the first embodiment of FIG. 1, it has been assumed that the light source S is spaced apart by a limited distance $r$, but a second embodiment shown in FIG. 2 is one in which the light source S is at infinity.

In this instance, $2\phi = \theta$ and equations (1) and (2) become as follows:

$$\theta = 2\phi_o \cdot \sin k_1 \cdot t$$

$$\omega = d\phi/dt = \tfrac{1}{2}(d\theta/dt) = k_1\phi_o \cdot \cos k_1 \cdot t$$

$$\omega = \pm k_1 \sqrt{\phi_o^2 - (\theta/2)^2}$$

Also, if $\phi = \theta/2$ and $r = \infty$ in equation (6), the following is obtained:

$$\frac{dy'}{d\theta} = \frac{k_2}{k_1} \cdot \frac{1}{\sqrt{4\phi_0^2 - \theta^2}}$$

Therefore, $$y' = \frac{k_2}{k_1} \cdot \arcsin\left(\frac{\theta}{2\phi_o}\right)$$

Also, from equation (10), the following is obtained:

$$k_2 = 2k_1\phi_o \cdot f$$

$$\therefore y' = 2\phi_o f \arcsin(\theta/2\phi_o) \qquad (12)$$

That is, where the light source is at infinity, namely, where a parallel beam is scanned by a sine vibration mirror and use is made of a lens having a distortion characteristic as represented by $y' = 2\phi_o f$ arcsin $(\theta/2\phi_o)$, uniform velocity scanning can be provided on the focusing surface.

Equation (12) is rewritten as follows:

$$y' = F \cdot \arcsin \vartheta \qquad (13)$$

$$F = k \cdot f \ (k = 2\phi_o, \ f: \text{focal length})$$

$$\vartheta = \theta/k \ (\theta: \text{angle of deviation}) \qquad (14)$$

The distortion characteristic lens given by equation (13) is realized when the distortion coefficients commonly used in the third-order and the fifth-order aberration range (V for the third-order distortion coefficient and $\hat{V}$ for the fifth-order distortion coefficient) assume the following values:

$$\begin{cases} V = \tfrac{2}{3}\left(1 - \tfrac{1}{2k^2}\right) \\ \hat{V} = 8\left(\tfrac{1}{6k^2} - \tfrac{3}{40k^4} - \tfrac{1}{5}\right) \end{cases} \qquad (15)$$

For simplicity, assume that $k = 1$. When the following values are assumed $$\begin{cases} V = \tfrac{1}{3} \\ \hat{V} = -\tfrac{13}{15}, \end{cases}$$

the deflected light by the sine vibration mirror may be made to scan at a uniform velocity on the focusing surface.

LENS EXAMPLE 1

Within the focal length $f = 120.90236$, F-number 60 and the half angle of view 23.1°, the lens has a focusing performance substantially up to the limit of diffraction and the deviation of the focus position is about $-0.16$mm with respect to the maximum ideal image height 50mm as shown in Table 2. In this instance, the third-order and the fifth-order distortion coefficients are $$V = 0.35410$$
$$\hat{V} = -0.49310$$

and thus, the third-order distortion coefficient is substantially approximate to its target value, but the fifth-order distortion coefficient is still insufficient.

LENS EXAMPLE 2

Within the focal length $f = 120.90236$, F-number 60 and the half angle of view 28.6°, the lens has a focusing performance substantially up to the limit of diffraction and the deviation of the focus position is about $-0.15$mm with respect to the maximum ideal image height 63mm as shown in Table 3. In this instance, the third-order and the fifth-order distortion coefficient are $$V = 0.35603$$
$$\hat{V} = -0.86765$$

and thus, both the third-order and the fifth-order distortion coefficient substantially satisfy their target values, as the result of which the lens of Example 2 is improved in performance up to a wide angle over the lens of Example 1.

Table 1

| | | | |
|---|---|---|---|
| $R_1 = 97.51304$ | $l_1 = 10.0173$ | | |
| $R_2 = -88.75264$ | $d_1 = 1.33564$ | $N_1 = 1.63632$ | $\nu_1 = 55.4$ |
| $R_3 = -29.94222$ | $l_2 = 1.12862$ | | |
| $R_4 = 112.65680$ | $d_2 = 0.66782$ | $N_2 = 1.52946$ | $\nu_2 = 48.9$ |
| $R_5 = -208.01358$ | $l_3 = 3.29450$ | | |
| $R_6 = -28.93115$ | $d_3 = 8.71505$ | $N_3 = 1.51464$ | $\nu_3 = 64.1$ |
| $f = 120.90236$ | | | |
| F/60 | | | |
| $\omega/2 = 23.1°$ | | | |
| $\lambda = 6328\text{A}$ | | | |

Table 2

| | | | |
|---|---|---|---|
| $R_1 = 74.10586$ | $l_1 = 12.61617$ | | |
| $R_2 = -74.74731$ | $d_1 = 1.68216$ | $N_1 = 1.63632$ | $\nu_1 = 55.4$ |
| $R_3 = -36.64146$ | $l_2 = 1.42143$ | | |
| $R_4 = 68.22883$ | $d_2 = 0.84108$ | $N_2 = 1.52946$ | $\nu_2 = 48.9$ |
| $R_5 = -161.82437$ | $l_3 = 9.89909$ | | |
| $R_6 = -34.41781$ | $d_3 = 10.97606$ | $N_3 = 1.51464$ | $\nu_3 = 64.1$ |
| $f = 120.90236$ | | | |
| F/60 | | | |
| $\omega/2 = 28.6°$ | | | |
| $\lambda = 6328\text{A}$ | | | |

Table 3

| Aberration Coefficients | Embodiment 1 | Embodiment 2 |
|---|---|---|
| I | 2.95754 | 2.78017 |
| II | 0.48911 | 1.14629 |
| III | $-0.02753$ | $-0.03286$ |
| P | 0.46500 | 0.44748 |
| V | 0.35410 | 0.35603 |
| $\overset{*}{\text{I}}$ | $-248.76510$ | $-557.74387$ |
| $\overset{*}{\text{II}}$ | $-3.88750$ | $-4.29462$ |
| $\text{I}_F$ | $-29.95908$ | $-26.435$ |
| $\text{II}_P$ | $-4.50860$ | $-8.01904$ |
| $\hat{\text{I}}$ | $-48.94084$ | $-41.14218$ |
| $\hat{\text{II}}$ | $-3.74164$ | $-7.63083$ |
| $\hat{\text{III}}$ | $-0.24764$ | $-1.20962$ |
| $\hat{\text{IV}}$ | $-1.77797$ | $-2.71891$ |
| $\hat{\text{V}}$ | $-0.49310$ | $-0.86765$ |

Figure 6:
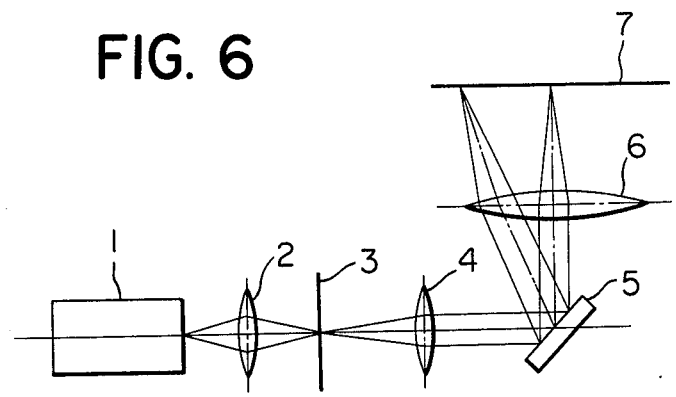
FIG. 6 is a schematic view showing an example of the information processing terminal unit using the scanning optical system of the present invention.

Description will now be made of an example of the scanning device of the present invention as applied to the information processing terminal unit. In FIG. 6, there is seen a modulated light source 1 such as a semiconductor laser which emits a light signal having its light intensity modulated, a condenser lens 2, a slit 3 disposed at a position whereat the light from the modulated light source is condensed by the condenser lens 2, and a collimater lens 4 disposed with its front focal point coincident with the slit 3. Thus, the light passed through the slit 3 passes through the collimater lens 4 and is thereby collimated into a parallel light beam. The parallel light beam from the collimater lens 4 is reflected by the reflecting surface of a galvanomirror 5 and the reflected light, which is in the form of a parallel beam, enters and passes through a focusing lens 6 so as to be focused on a scanned surface (sensitive film) 7. To effect high-speed vibration of the galvanomirror 5, a high frequency current must be flowed to the coil of the galvanomirror. Therefore, by flowing a high frequency current of sine form to the coil, the galvanomirror is vibrated in a sine form at high speed. Thus, in this case, the angle of deflection $\theta$ (the angle of incidence of the light upon the focusing lens) is $\theta = 2\phi = 2\phi_o \sin\omega t$, where $\phi$ is the angle of deviation of the mirror which effects the sine form vibration, $\phi_o$ is the amplitude of said vibration, $2\pi/\omega$ is the period of said vibration, and $t$ is time. If the focusing lens 6 used is $y = f\tan\theta$ lens having an image height proportional to the tangent of the angle of deflection or $y = f\theta$ lens having an image height proportional to the angle of deflection, the movement of the light spot on the scanned surface will not be at constant velocity with respect to time $t$.

For this reason, in the information processing terminal unit of FIG. 6, the scanned surface is scanned at a constant velocity by a deflector whose angle of deflection is variable in a sine form and a focusing lens for scanning whose image height $y$ has a relation that $y = 2\phi_o \cdot f \cdot \sin^{-1}(\theta/2\phi_o)$, where $\phi_o$ is the amplitude of the deflector as noted above, $f$ is the focal length of the focusing lens, and $\theta$ is the angle of incidence of the light upon the focusing lens. The focusing lens has two partial systems spaced apart from each other by a limited distance, and each of these partial systems comprises a single lens or a doublet lens.

The above-described focusing lens may be classified into two types by the power arrangement of each partial system. A first type refers to the case that a first partial system disposed toward the deflector has a negative refractive power and a second partial system disposed toward the scanned surface has a positive refractive power. A second type refers to the case that the first partial system disposed toward the deflector has a positive refractive power and the second partial system disposed toward the second surface has a negative power. When the focal length of the lens system is 1 (unity), let $\psi_1$ be the power of the first partial system, $\psi_2$ be that power of the second partial system and $B_{01}$ be the intrinsic coefficient of the first partial system which will hereinafter be described. Then, under the conditions that the focal length of the focusing lens system is 1 (unity) and the refractive indices $N_1$ and $N_2$ of the first and the second partial systems are $1.46 \leq N_1 \leq 1.84$ and $1.46 \leq N_2 \leq 1.84$, $\psi_1$, $\psi_2$ and $B_{01}$ of the first type lens will be:

$-5.5 \leq \psi_1 \leq -0.35$ $1.2 \leq \psi_2 \leq 5.7$ $-10 \leq B_{01} \leq 3$ and those of the second type lens will be:

$1.35 \leq \psi_1 \leq 5.5$ $-5.3 \leq \psi_2 \leq -0.4$ $-13 \leq B_{01} \leq 4$ A doublet lens may be used as each of the partial systems where the light beam passed through the focusing lens is other than monochromatic light, for example, when it is a light of plural wavelengths or white light, and in such cases, chromatic aberration may be well corrected.

The lens for scanning used with an information processing terminal unit, particularly, a printer, which employs a deflector for effecting the deflection of light by sine form vibration, is featurized in that it has a wide angle of view and that the ideal focus position has the relation, as noted above, that $y = 2\phi_o \cdot f \cdot \sin^{-1}(\theta/2\phi_o)$, where $y$ is the distance between a point whereat the optic axis of the focusing lens intersects the scanned surface and a scanning point whereat writing or reading is taking place, $f$ is the focal length of the focusing lens for scanning, and $\theta$ is the angle formed between the beam entering the focusing lens for scanning and the optic axis of this lens. Usually, the image height $y'$ at which a light beam is focused by a lens is represented by a function of the angle of incidence $\theta$ of the light beam upon the lens, and with $Ai$ as constant and with the focal length of the lens as 1 (unity), the image height is expressed as follows: (The logical expressions about aberrations appearing hereinafter are based on *How to Design Lenses* written by Yoshiya Matsui and published in 1972 by Kyoritsu Shuppan Co., Ltd.)

$$y' = \sum_{i=0}^{\infty} A i \theta^i \qquad (16)$$

With V as the third-order distortion coefficient, the relation between such coefficient and distortion is expressed by the following equation:

$$\text{Distortion (\%)} = \frac{y' - \tan\theta}{\tan\theta} \times 100 = -50V \tan^2\theta \qquad (17)$$

Substitute equation (16) for equation (17) and by disregarding the fourth-order and higher order terms, rearrange the equation (17):

$$A_0 + (A_1 - 1)\theta + A_2\theta^2 + (A_3 - \frac{1}{3} + \frac{V}{2})\theta^3 = 0 \qquad (18)$$

in order that equation (18) may be established irrespective of the value of $\theta$, $$\left.\begin{array}{l} A_0 = A_2 = 0 \\ A_1 - 1 = 0 \\ A_3 - \frac{1}{3} + \frac{V}{2} = 0 \end{array}\right\} \qquad (19)$$

Thus, the image height $y'$ which can be realized in the range of the third-order aberration is expressed:

$$y' = f(\theta + A_3\theta^3) \qquad (20)$$

where $f$ is the focal length, and in that case, the third-order distortion coefficient V is:

$$V = 2(\tfrac{1}{3} - A_3)$$

Accordingly, in the $$y' = 2\phi_o \cdot f \cdot \sin^{-1}\left(\frac{\theta}{2\phi_o}\right) \text{ lens, } A_3 = \frac{1}{6(2\phi_o)^2}$$

is derived from equation (20) and accordingly, the third-order distortion coefficient V is:

$$V = \frac{2}{3}\left(1 - \frac{1}{2k^2}\right) \quad (k \equiv 2\phi_o) \tag{21}$$

Figure 7:
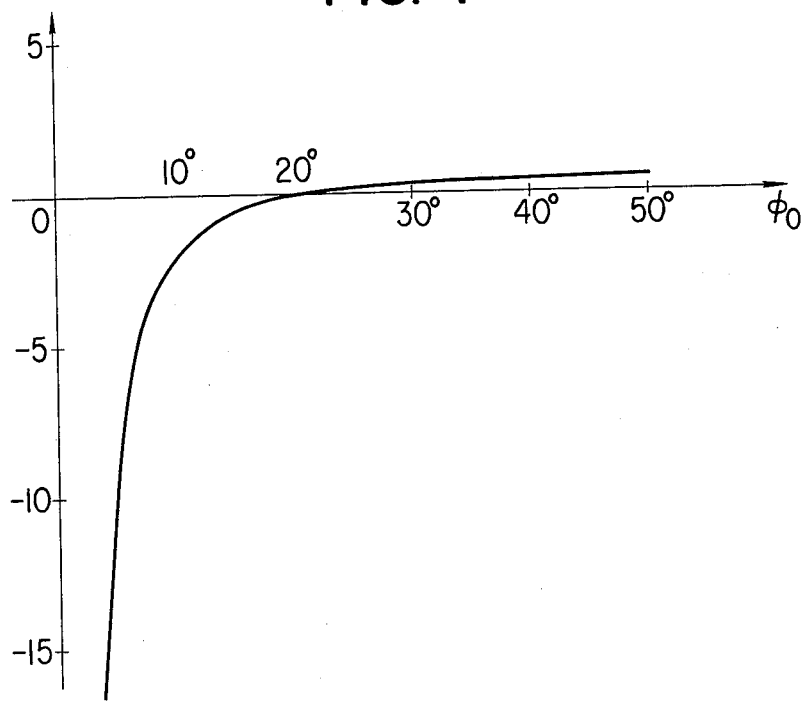
FIG. 7 is a graph illustrating the relationship between the amplitude $\phi_o$ of the vibratory mirror and the third-order distortion V.

FIG. 7 shows the variation in third-order distortion coefficient resulting from the variation in amplitude $\phi_o$. As is apparent from FIG. 7, the smaller the amplitude $\phi_o$, the greater the negative absolute value of V.

In common lenses, the aberration coefficients to be corrected in the range of the third-order distortion coefficient are I: spherical aberration, II: coma, III: astigmatism, P: Petsval sum and V: distortion. On the assumption that $f = 300$ mm, FNO $= 60$ and $\omega/2 = 20°$, calculate the acceptable ranges of I and II so that the spot size on the focal plane may be approximately a limit of diffraction. When FNO $= 60$, the spot size for the light of $\lambda = 0.6328\mu$ is approximately 0.1mm and therefore, if hallo and coma on the focal plane are 0.5mm or less and they are considered within the range of the third-order aberration coefficient, $$\text{hallo} = 0.05 \geq \left|\frac{R^3 \cdot I}{2\alpha' k}\right| \tag{22}$$

$$\text{coma} = 0.05 \geq \left|\frac{3\tan\omega/2 \cdot R^2 \cdot II}{2\alpha' k}\right| \tag{23}$$

where $\alpha' k$: converted inclination of the paraxial rays on the image side which may be represented by $1/f$;
R: radius of the entrance pupil when the focal length of the entire system is regularized to 1 (unity). Hence, $|I| \leq 576$ and $|II| \leq 4.4$.

From this, it follows that little attention need be paid to spherical aberration and coma as the objects to be corrected but, with the wide angle of view taken into account, astigmatism III, Petzval sum P and distortion V are the only aberrations which must be corrected. Of these three aberrations, P may be taken into consideration when the power arrangement of the lens system is determined.

Thus it is seen that the aberrations in the scanning lens of this type which must be corrected are, in the third-order aberration range, astigmatism III and distortion V alone.

According to the theory of aberration, it is also seen that the degree of freedom for the aberrations which can be varied by varying the shape of the lens surface of a thin single lens is 1 (unity).

Thus, the aberrations in the scanning lens of this type which must be corrected are III and V, and if, in order to correct these two aberrations, the lens system comprises two partial systems and each of these partial systems is a single lens, the degree of freedom for the aberrations will be 2 and there is thus a solution for enabling the aberrations in the lens system of this type to agree with the target values of the aberration coefficients.

The foregoing will now be explained by the use of mathematical expressions. Assume that III $= 0$ and V $= \tfrac{2}{3}(1 - 1/2k^2)$ are the target values and that the optical system comprises two partial systems each of which is a thin single lens. Obtain the shape of the thin single lens in each partial system from the power arrangement of the two partial systems. The intrinsic coefficients $A_0$, $B_0$ and $P_0$ of the thin single lens may be written as follows:

$$A_{Oi} = \left(\frac{N_i}{N_i - 1}\right)^2 - \frac{2N_i + 1}{N_i - 1}\left(\frac{1}{R_i}\right) + \frac{N_i + 2}{N_i}\left(\frac{1}{R_i}\right)^2 \tag{24}$$

$$B_{Oi} = -\frac{N_i}{N_i - 1} + \frac{N_i + 1}{N_i}\left(\frac{1}{R_i}\right) \tag{25}$$

$$P_{Oi} = \frac{1}{N_i} \tag{26}$$

where R represents the curvature radius of the front surface of the thin single lens. By the use of these specific coefficients, the third-order aberration coefficients III and V of the optical system may be expressed as:

$$\text{III} = a_{III1}A_{01} + b_{III1}B_{01} + c_{III1} + a_{III2}A_{02} + b_{III2}B_{02} + c_{III2} \tag{27}$$

$$V = \frac{2}{3}\left(1 - \frac{1}{2k^2}\right) = a_{V1}A_{01} + b_{V1}B_{01} + c_{V1} + a_{V2}A_{02} + b_{V2}B_{02} + c_{V2} \tag{28}$$

The suffixes represents the numbers of the partial systems, that is, suffix 1 represents the first partial system and suffix 2 represents the second partial system. From equations (24) and (25), $A_0$ is expressed by $B_0$, as follows:

$$A_{Oi} = \frac{m_{3i}}{n_{2i}^2}B_{Oi}^2 + \left(\frac{m_{2i}}{n_{2i}} - 2m_{3i}\frac{n_{1i}}{n_{2i}^2}\right)B_{Oi} + \left(m_{1i} - m_{2i}\frac{n_{1i}}{n_{2i}} + m_{3i}\frac{n_{1i}^2}{n_{2i}^2}\right) \tag{29}$$

$$\begin{pmatrix} m_{1i} = \left(\frac{N_i}{N_i - 1}\right)^{20}, m_{2i} = \frac{2N_i + 1}{-N_i - 1}, m_{3i} = \frac{N_i + 2}{N_i} \\ n_{1i} = \frac{N_i}{N_i - 1}, n_{2i} = \frac{N_i + 1}{N_i} \end{pmatrix} \tag{30}$$

Substitute equation (19) for equations (27) and (28) to obtain:

$$\text{III} = a_{III1}\frac{m_{31}}{n_{21}^2}B_{01}^2 + \left\{a_{III1}\left(\frac{m_{21}}{n_{21}} - 2m_{31}\frac{n_{11}}{n_{21}^2}\right) + b_{III1}\right\} \tag{31}$$

$$B_{01} + a_{III2}\frac{m_{32}}{n_{22}^2}B_{02}^2 + \left\{a_{III2}\left(\frac{m_{22}}{n_{22}} - 2m_{32}\frac{n_{12}}{n_{22}^2}\right) + b_{III2}\right\}B_{02} + a_{III1}\left(m_{11} - m_{21}\frac{n_{11}}{n_{21}} + m_{31}\frac{n_{11}^2}{n_{21}^2}\right) + a_{III2}\left(m_{12} - m_{22}\frac{n_{12}}{n_{22}} + m_{32}\frac{n_{12}^2}{n_{22}^2}\right) + c_{III1} + c_{III2}$$

-continued $$a_{III_2}l_{12}\left(\frac{T_2l_{11}}{T_1}\right)^2 B_{01}^4 + 2a_{III_2}l_{12}\left(\frac{T_2l_{11}}{T_1}\right) \tag{35}$$

$$\left(\frac{T_2l_{21} + T_3}{T_1}\right)B_{01}^3 + \left[a_{III_1}l_{11} + a_{III_2}l_{12}\left\{2\left(\frac{T_2l_{11}}{T_1}\right)\left(\frac{T_2l_{31} + T_4}{T_1}\right) + \left(\frac{T_2l_{21} + T_3}{T_1}\right)^2\right\}\right] +$$

$$(a_{III_2}l_{22} + b_{III_2})\left(\frac{T_2l_{11}}{T_1}\right)\right]B_{01}^2 + \left[(a_{III_1}l_{21} + b_{III_1}) + 2a_{III_2}l_{12}\left(\frac{T_2l_{31} + T_3}{T_1}\right)\right.$$

$$\left(\frac{T_2l_{31} + T_4}{T_1}\right) + (a_{III_2}l_{22} + b_{III_2})\left(\frac{T_2l_{21} + T_3}{T_1}\right)\right]$$

$$B_{01} + a_{III_2}l_{12}\left(\frac{T_2l_{31} + T_4}{T_1}\right)^2 + (a_{III_2}l_{22} + b_{III_2})$$

$$\left(\frac{T_2l_{31} + T_4}{T_1}\right) + a_{III_1}l_{31} + a_{III_2}l_{32} + c_{III_1} + c_{III_2} - III = 0$$

$$V = \frac{2}{3}\left(1 - \frac{1}{2k^2}\right) = a_{V1}\frac{m_{31}}{n_{21}^2} B_{01}^2 + \left\{a_{V1}\left(\frac{m_{21}}{n_{21}} - \right.\right. \tag{32}$$

$$\left.\left.2m_{31}\frac{n_{11}}{n_{21}^2}\right) + L_{V1}\right\}B_{01} +$$

$$a_{V2}\frac{m_{32}}{n_{22}^2} B_{02}^2 + \left\{a_{V2}\left(\frac{m_{22}}{n_{22}} - 2m_{32}\frac{n_{12}}{n_{22}^2}\right) + b_{V2}\right\}B_{02} +$$

$$a_{V1}\left(m_{11} - m_{21}\frac{n_{11}}{n_{21}} + m_{31}\frac{n_{11}^2}{n_{21}^2}\right) + a_{V2}$$

$$\left(m_{12} - m_{22}\frac{n_{12}}{n_{22}} + m_{32}\frac{n_{12}^2}{n_{22}^2}\right) + c_{V1} + c_{V2}$$

Eliminate $B_{02}^2$ from equations (31) and (32) to express $B_{02}$ by $B_{01}$:

$$B_{02} = \frac{T_2l_{11}}{T_1} B_{01}^2 + \frac{T_2l_{21} + T_3}{T_1} B_{01} \frac{T_2l_{31} + T_4}{T_1} \tag{33}$$

$$\left\{\begin{array}{l} l_{1i} = \frac{m_{3i}}{n_{2i}^2}, l_{2i} = \frac{m_{2i}}{n_{2i}} - 2m_{3i}\frac{n_{1i}}{n_{2i}^2}, l_{3i} = m_{1i} - \\ \\ m_{2i}\frac{n_{1i}}{n_{2i}} + m_{3i}\frac{n_{1i}^2}{n_{2i}^2} \\ \\ T_1 = a_{V2}b_{III_2} - a_{III_2}b_{V2}, T_2 = a_{III_2}a_{V1} - a_{III_1}a_{V2}, \\ \\ T_3 = a_{III_2}b_{V1} - a_{V2}b_{III_1}, \\ \\ T_4 = a_{III_2}\left\{c_{V1} + c_{V2} - \frac{2}{3}\left(1 - \frac{1}{2k^2}\right)\right\} - \\ \\ a_{V2}(c_{III_1} + c_{III_2} - III) \end{array}\right. \tag{34}$$

Substitute equation (33) for equation (31) to rearrange $B_{02}$:

Thus, by solving the quartic of equation (35), $B_{01}$ of the first partial system in which the third-order aberration coefficients III and V of the optical system are III = 0 and $V = \frac{2}{3}(1 - 1/2k^2)$ is obtained, and by substituting the $B_{01}$ for equation (33), $B_{02}$ of the second partial system is obtained. Once $B_{01}$ and $B_{02}$ are so obtained, the shapes of the first and the second partial system may be determined by equation (25).

From the intrinsic coefficients of the two partial systems of the optical system, I and II can be obtained by the following equations.

$$I = a_{I1}A_{01} + b_{I1}B_{01} + c_{I1} + a_{I2}A_{02} + b_{I2}B_{02} + c_{I2} \tag{36}$$

$$II = a_{II1}A_{01} + b_{II1}B_{01} + c_{II1} + a_{II2}A_{02} + b_{II2}B_{02} + c_{II2} \tag{37}$$

Also, by the use of equation (26), the Petzval sum $\underline{P}$ of the lens system is expressed as:

$$\underline{P} = \psi_1 P_{01} + \psi_2 P_{02} \tag{38}$$

where $\psi_1$: power of the first partial system when the focal length of the entire lens system is 1;

$\psi_2$: power of the second partial system when the focal length of the entire lens system is 1.

Further, the total power $\phi$ is:

$$\phi = \psi_1 + \psi_2 - e'\psi_1\psi_2 \tag{39}$$

where $e'$ is the distance between the principal points of the first and second partial systems.

There are three types of the lens in which the lens system comprises two partial systems, namely, as viewed from the deflector side, a positive lens — a positive lens, a positive lens — a negative lens, and a negative lens — a positive lens. However, in the positive-positive lens type, both the two partial systems have positive power so that the Petzval sum is greater. Therefore, curvature of image field and astigmatism cannot be corrected. As regards the positive-negative lens type and the negative-positive lens type, which of them is suitable is determined by the amplitude of the galvanomirror. The reason is that, as seen from equation (21), the value of V to be corrected is varied by the amplitude. As can be seen from FIG. 7, the distortion coefficient V approaches $\frac{2}{3}$ for greater amplitude, and V = 0 for $\phi_o = 20.2571°$ and V is greater in its negative absolute value as $\phi_o$ is smaller. Thus, in the focusing lens when the amplitude is great, the distortion to be corrected is of the negative sign; in the focusing lens when $\phi_o = 20.2571°$, the distortion to be corrected is zero; and in the focusing lens when $\phi_o$ is small, the distortion to be corrected is of the positive sign. Therefore, in the focusing lens when $\phi_o$ is great, it is necessary to dispose a positive lens at a greater height of principal rays to create negative distortion, and in the focusing lens when $\phi_o$ is small, it is necessary to dispose a negative lens at a greater height of principal rays to create positive distortion. In the focusing lens of this type, the entrance pupil lies forwardly thereof and necessarily, the greater height of principal rays provides the rearward partial system. Accordingly, for the scanning lens of this type when $\phi_o$ is great, the negative-positive lens type is suitable; for the scanning lens of this type when $\phi_o = 20°$ or in its vicinity, any of the negative-positive or the positive-negative lens type is suitable; and for the scanning lens of this type when $\phi_o$ is small, the positive-negative lens type is suitable.

Figure 8:
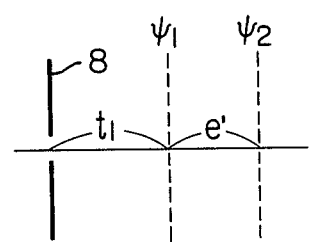
FIG. 8 illustrates the power arrangement of the focusing lens for scanning used with the present invention.
Figure 9:
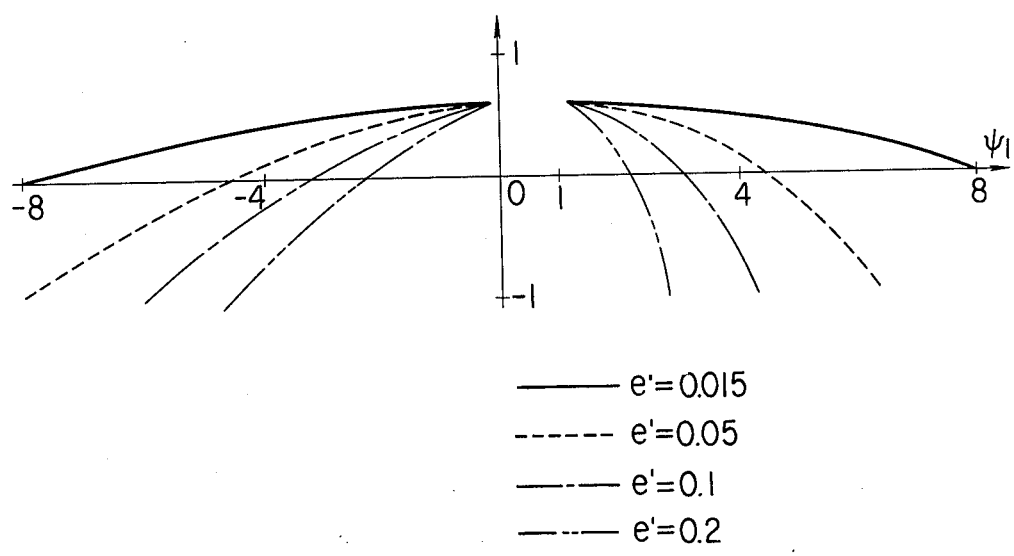
FIG. 9 graphically illustrates the variations in Petzval sum caused when the power arrangement of the lens of FIG. 8 is varied.
Figure 10:
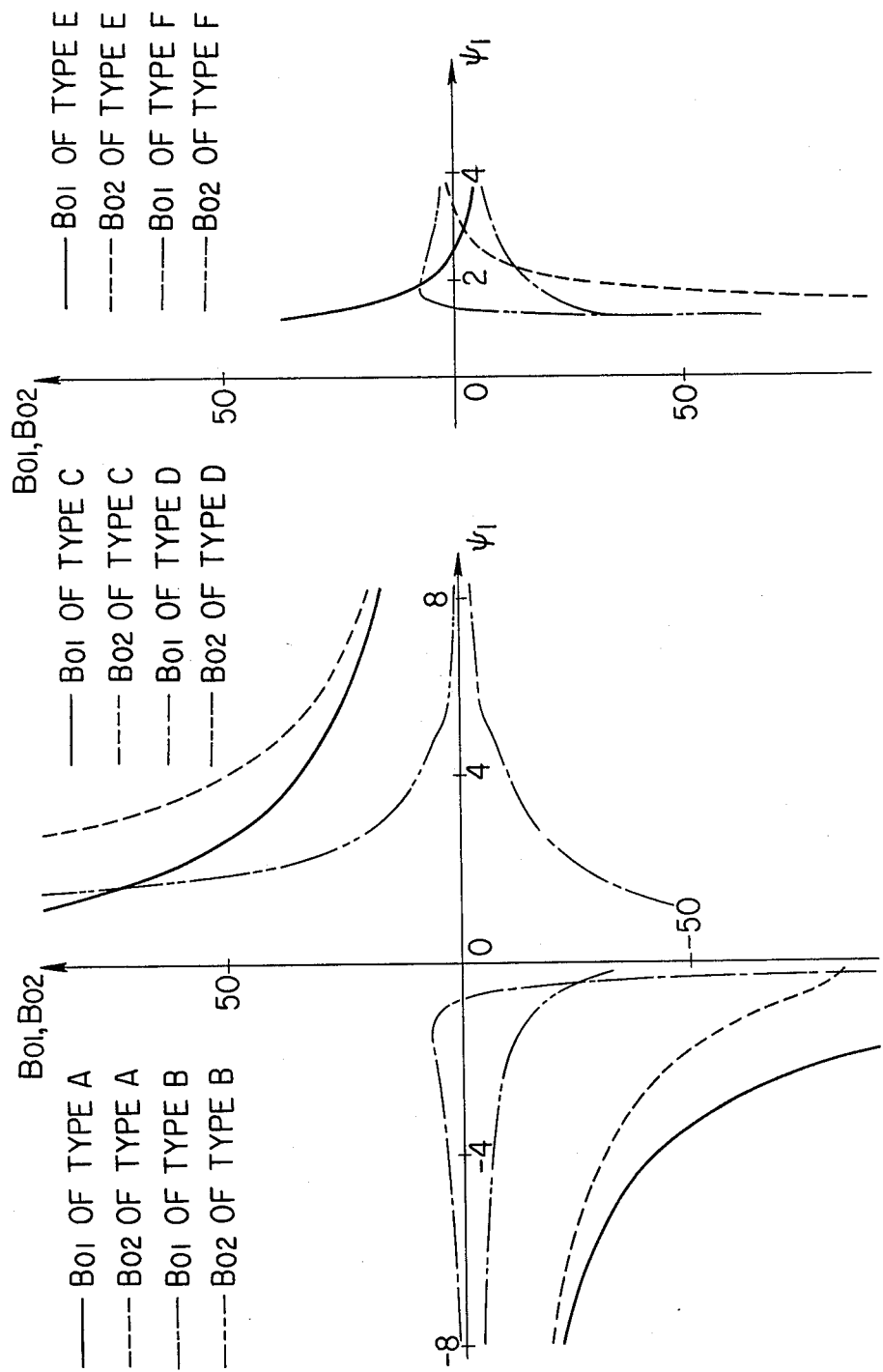
FIGS. 10 to 36 graphically illustrate the variations in specific values $B_{01}$ and $B_{02}$ caused when the elements of the lens in the information processing terminal unit of FIG. 6 are changed.
Figure 11:
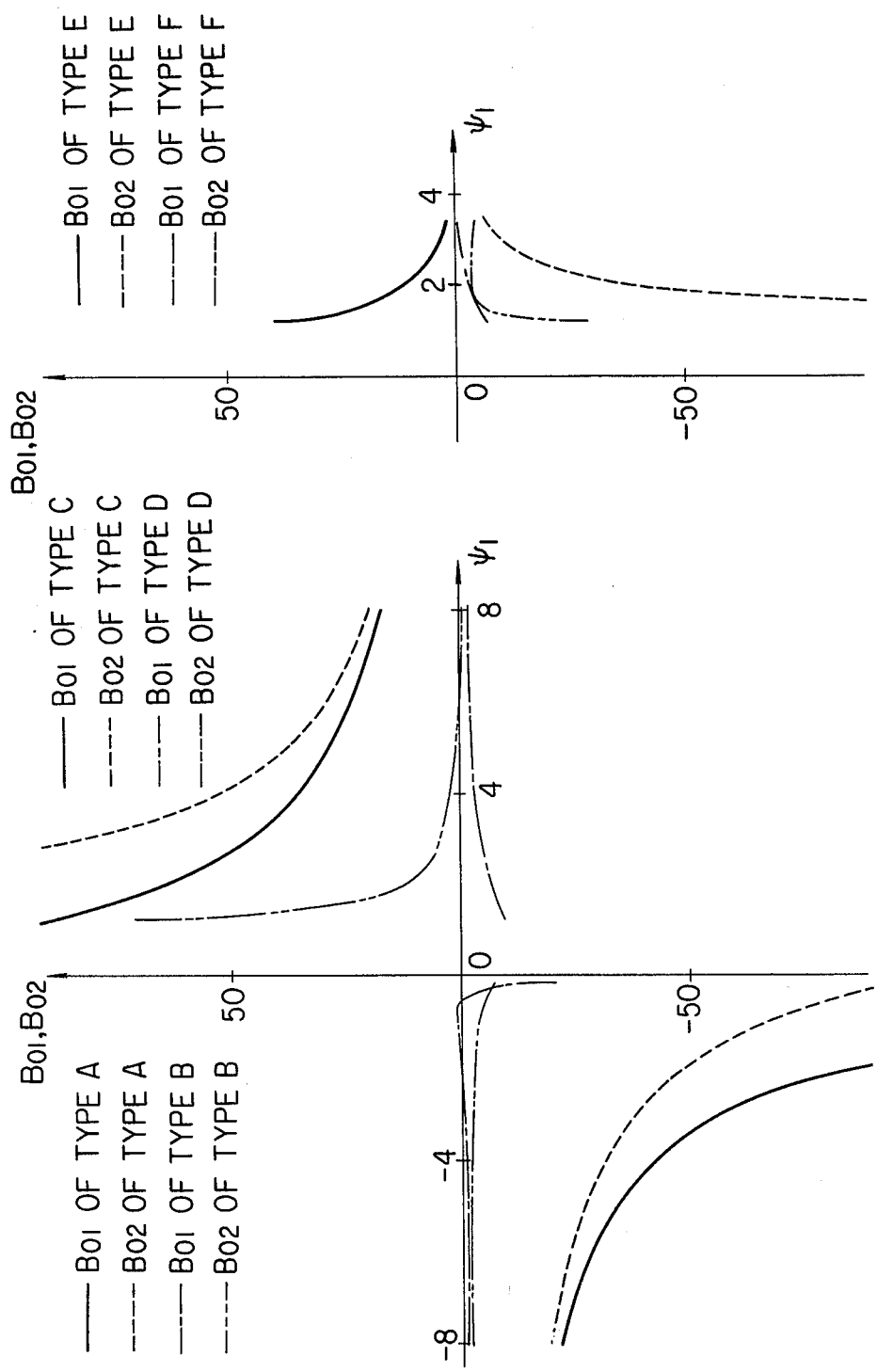
Figure 12:
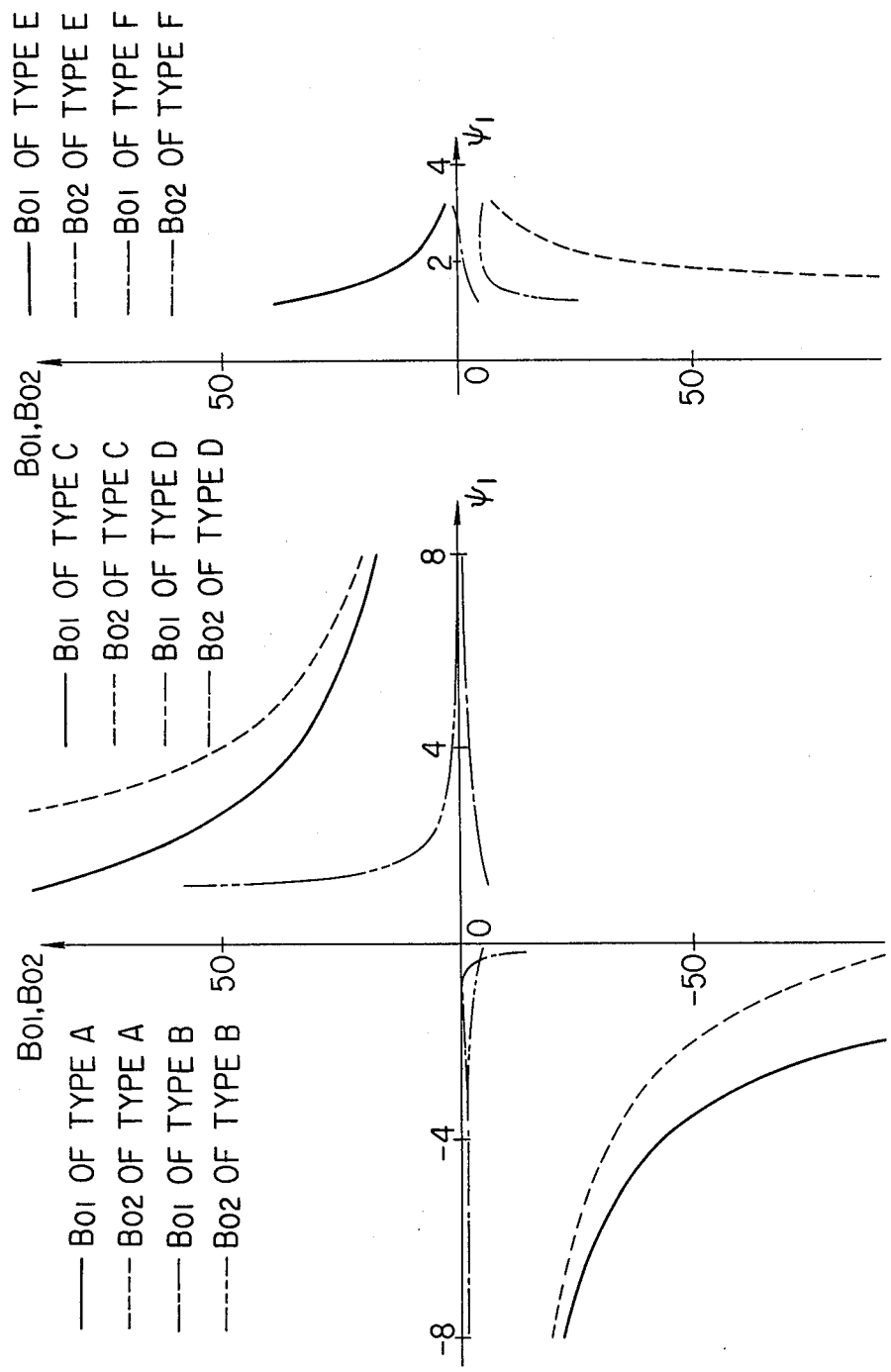
Figure 13:
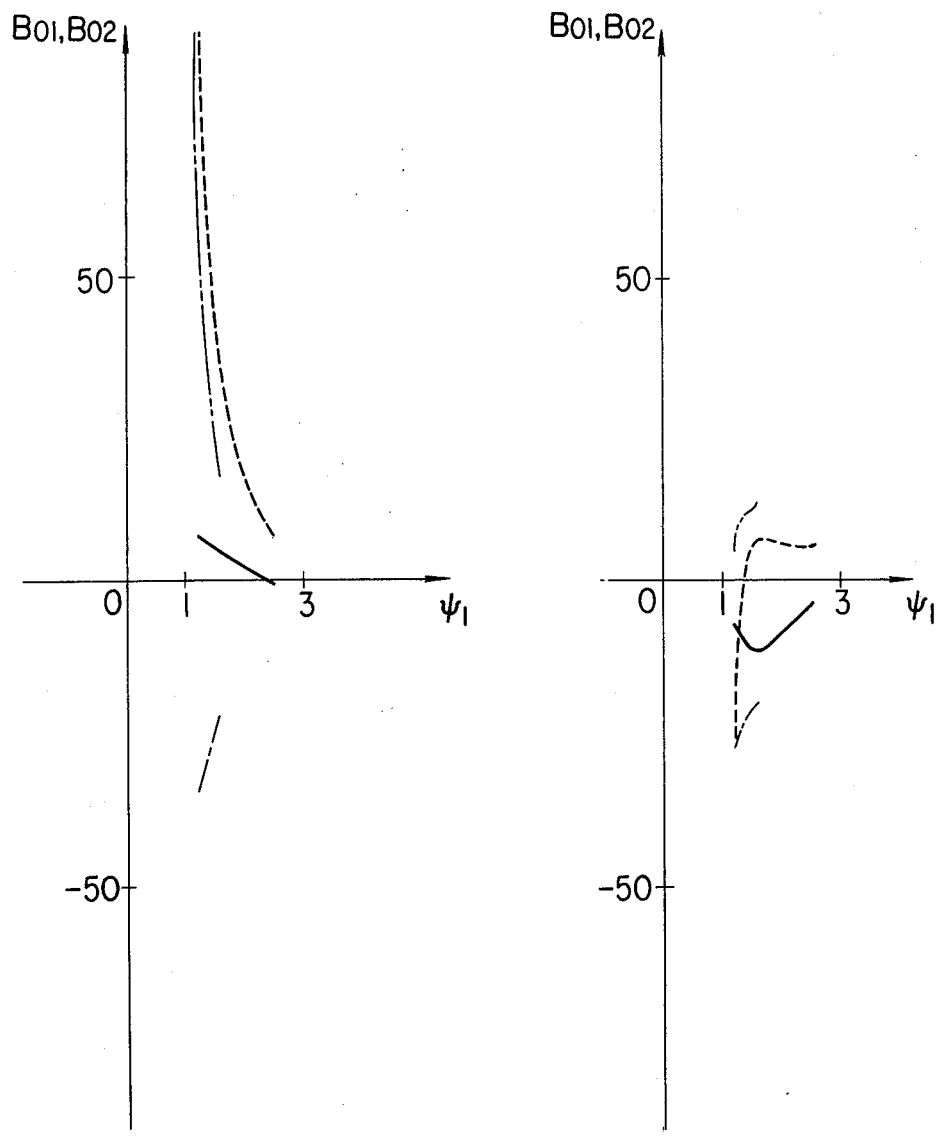
Figure 14:
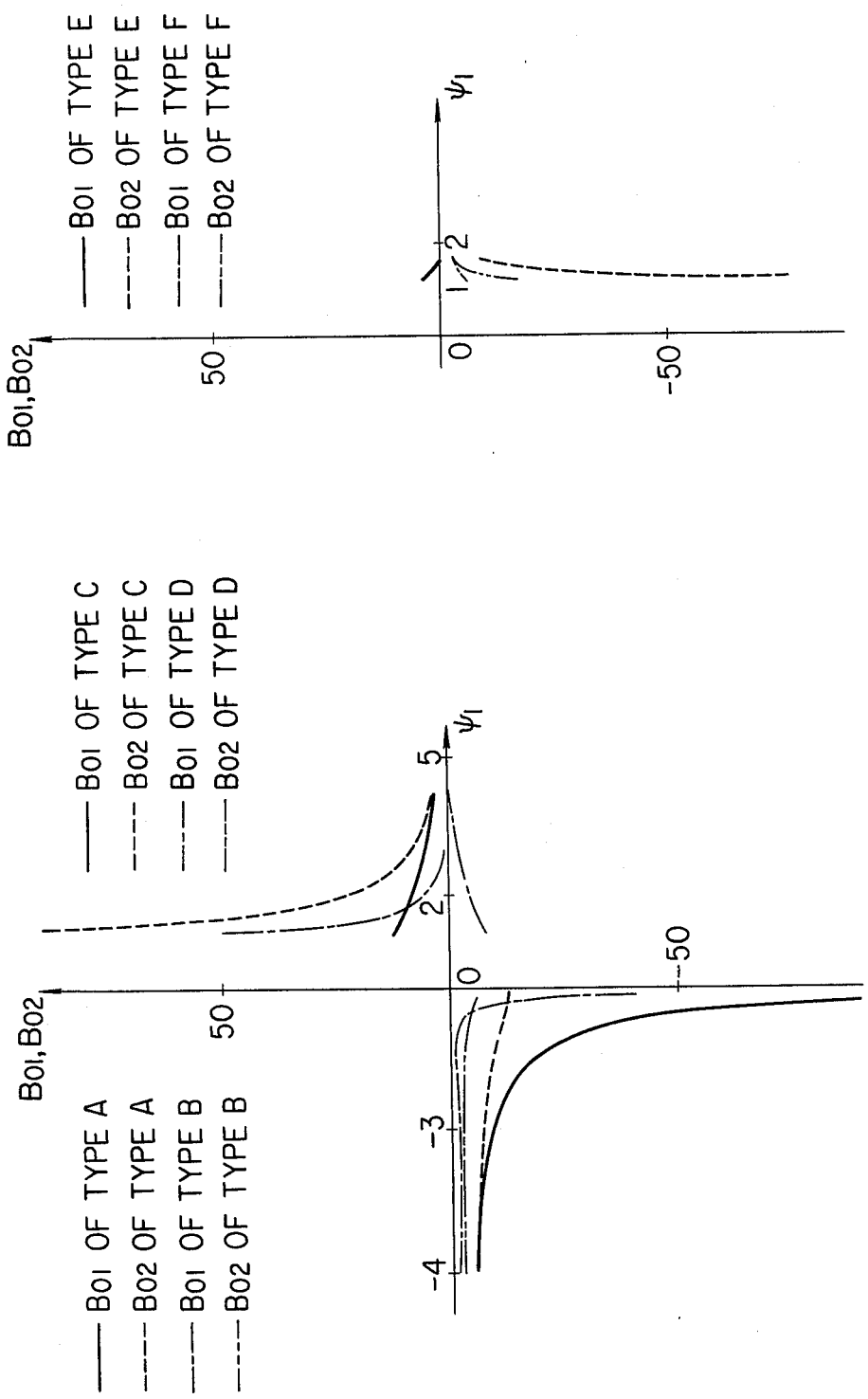
Figure 15:
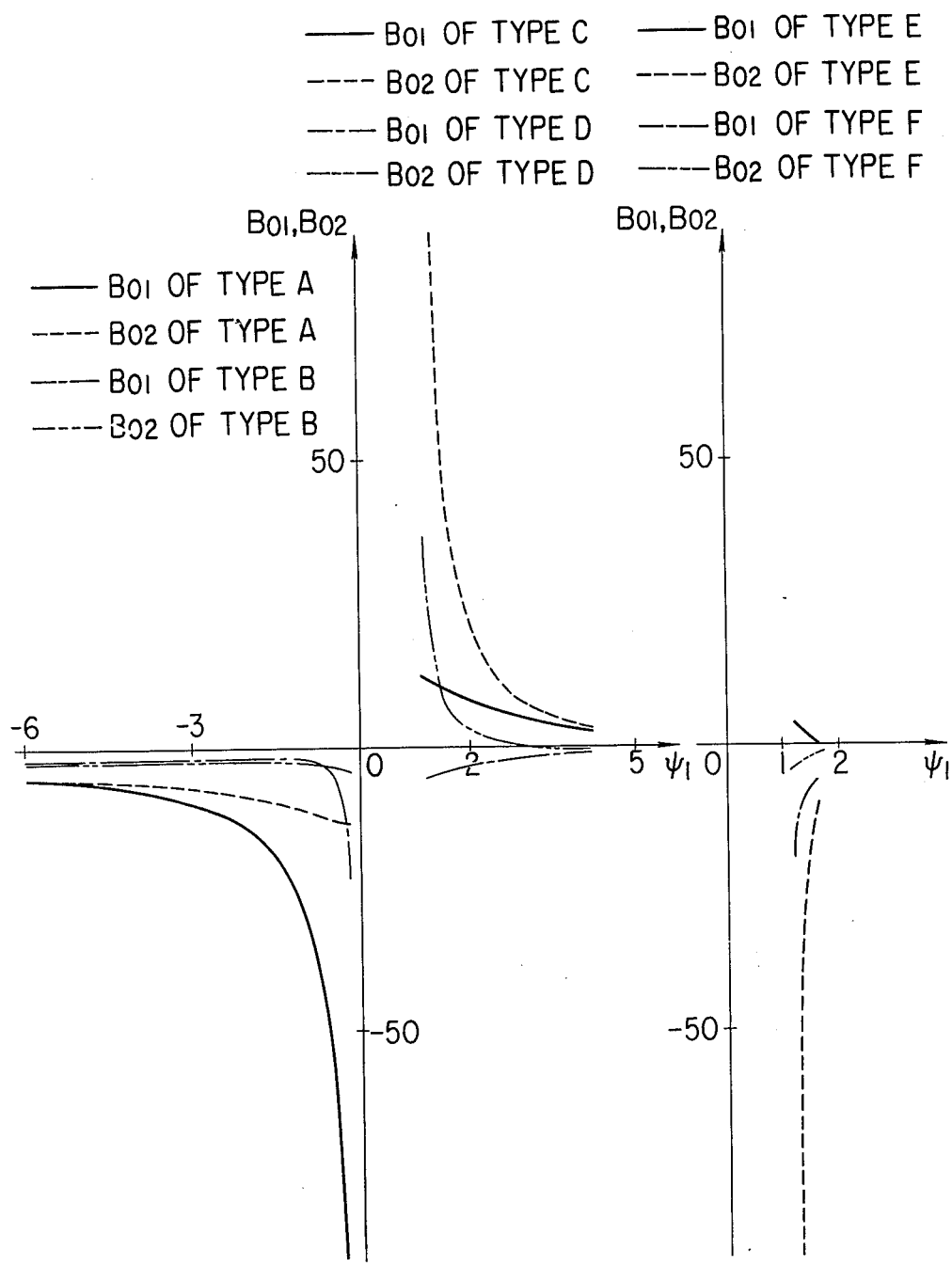
Figure 16:
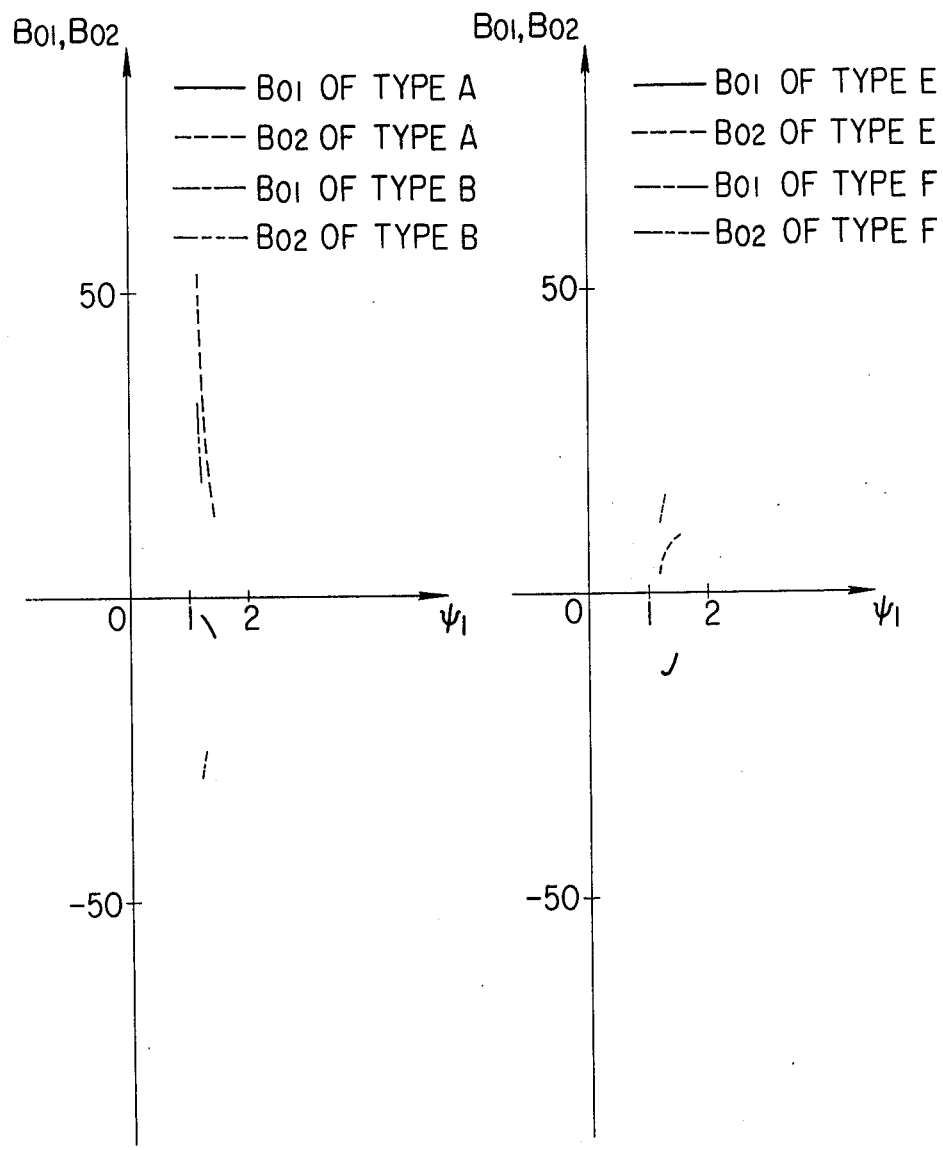
Figure 17:
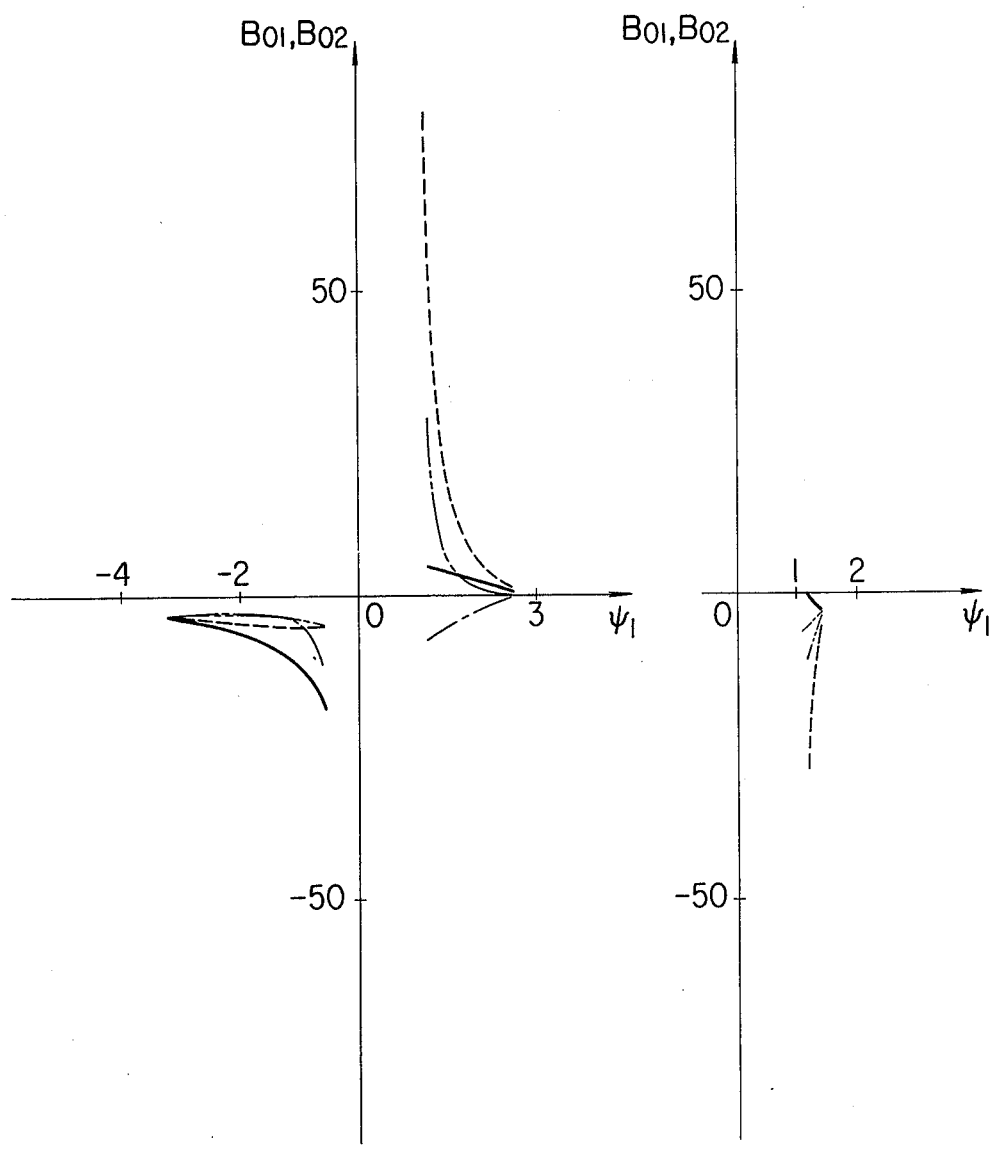
Figure 18:
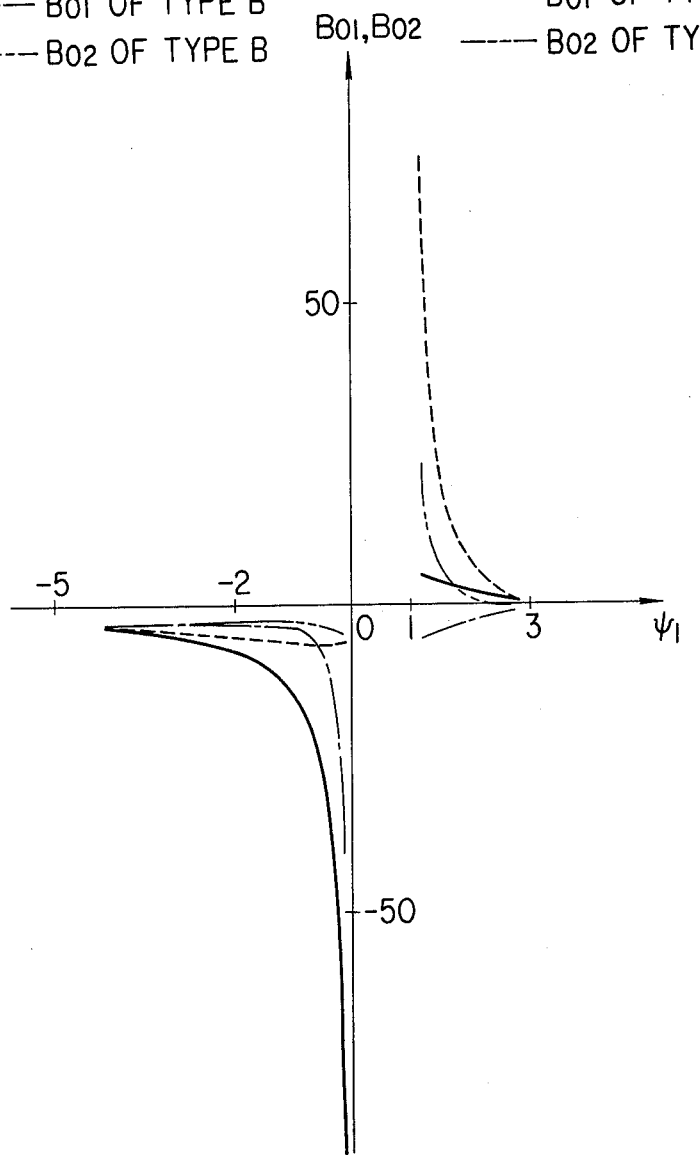
Figure 19:
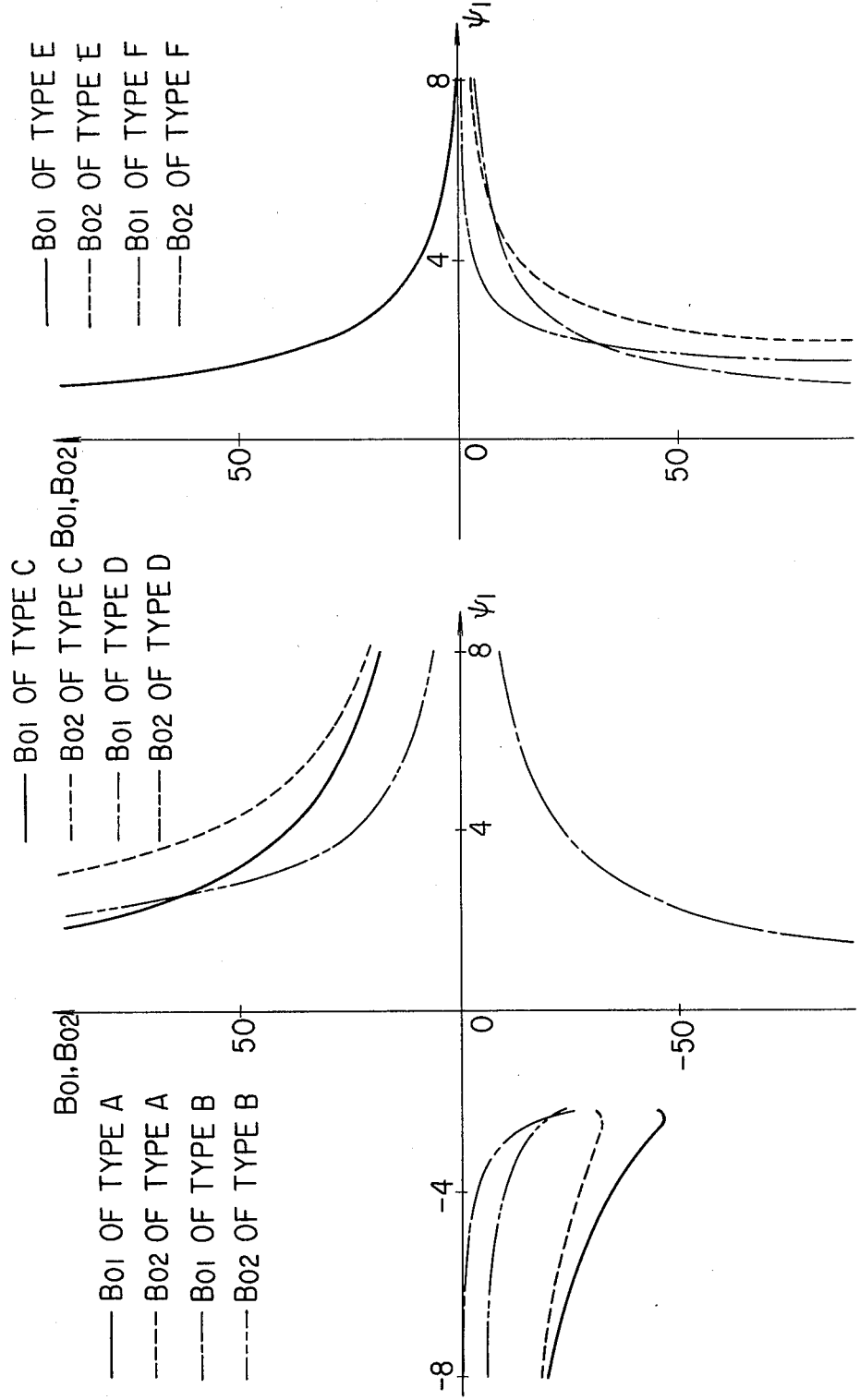
Figure 20:
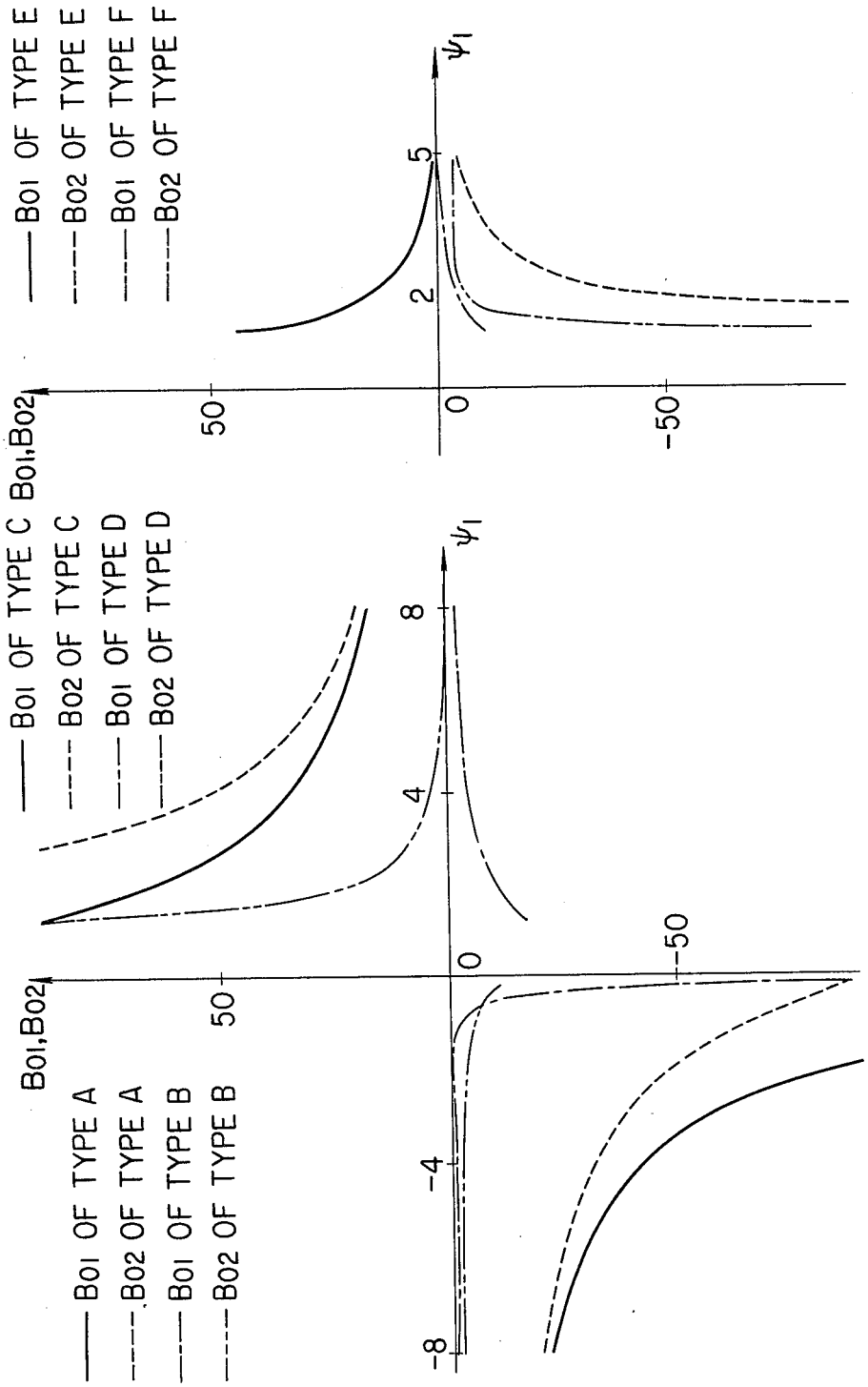
Figure 21:
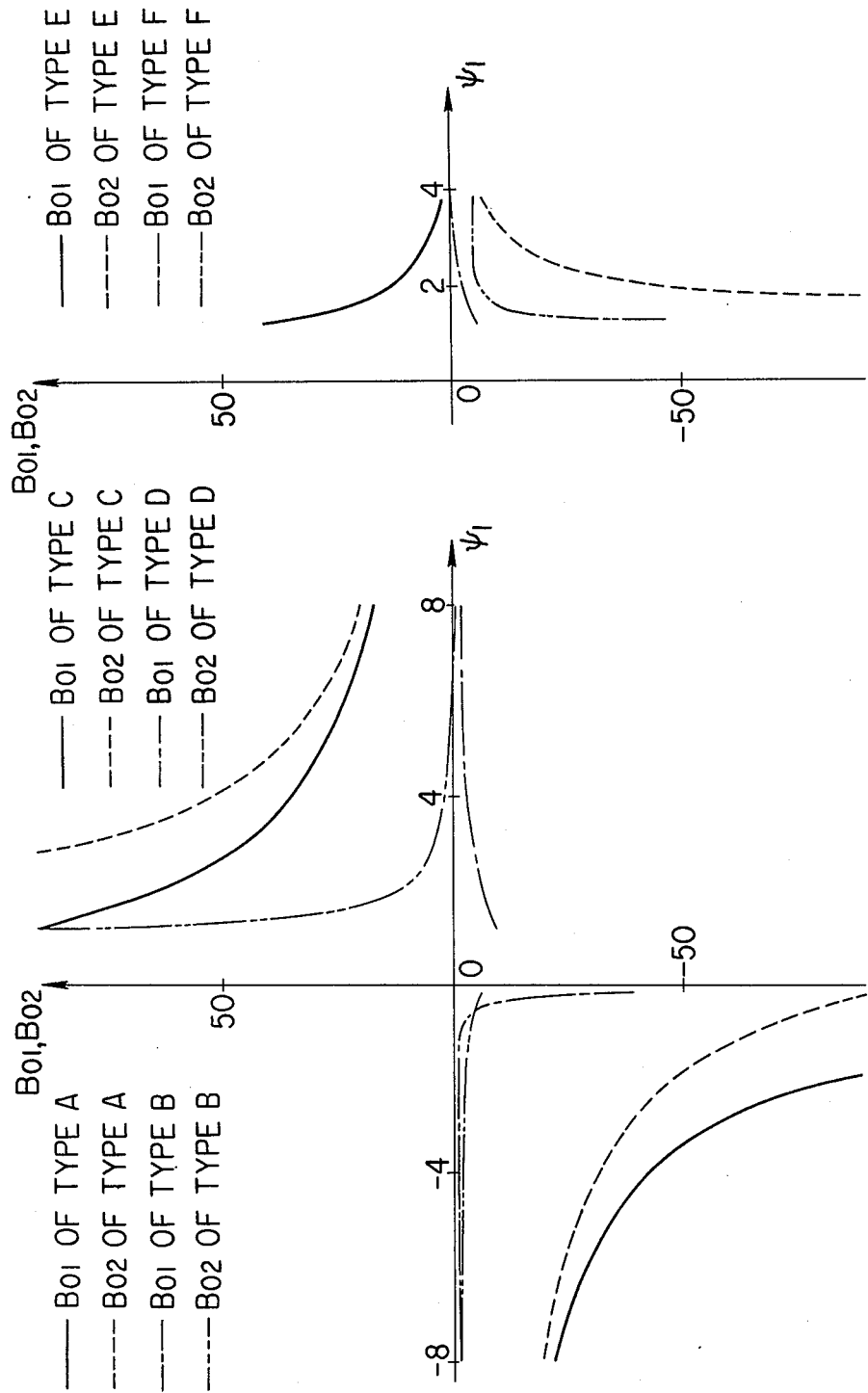
Figure 22:
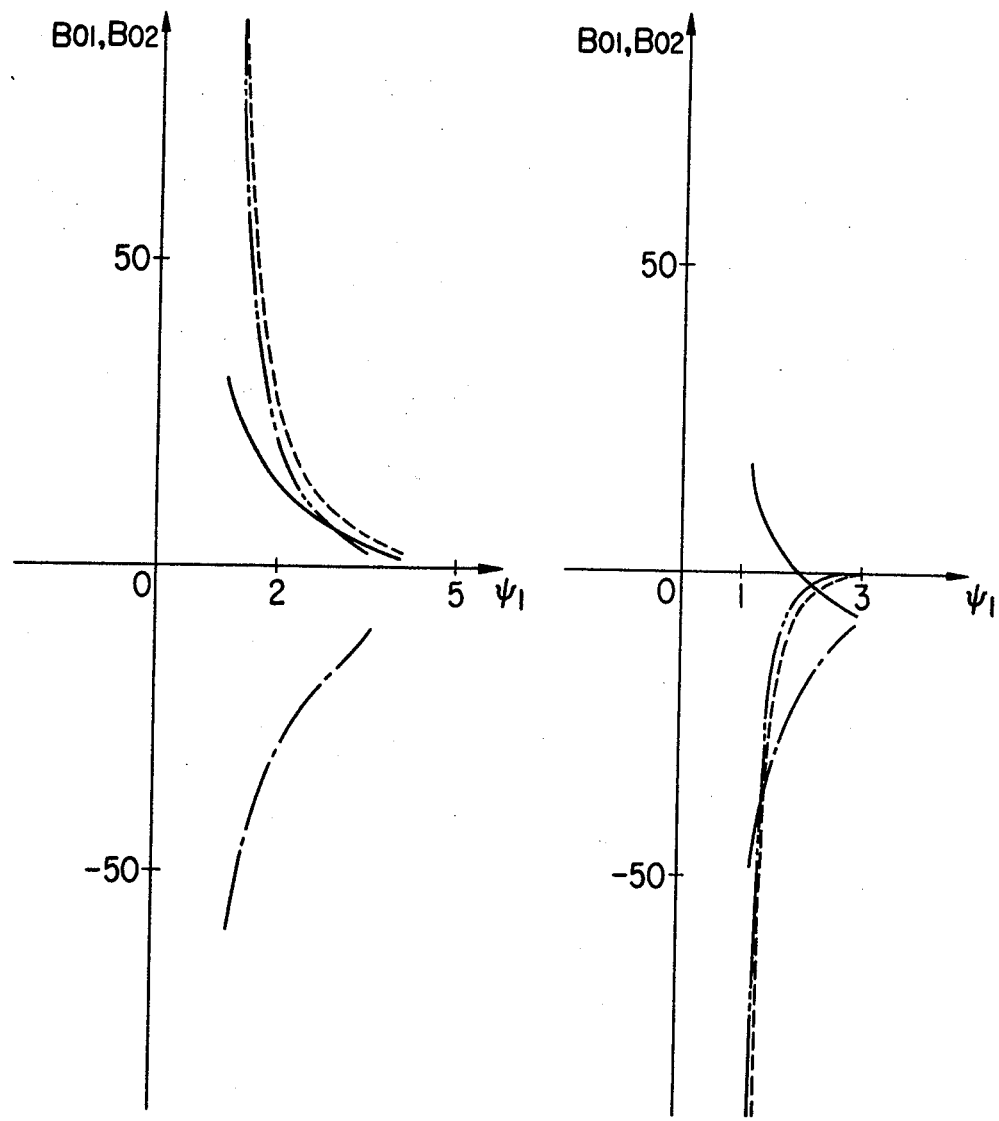
Figure 23:
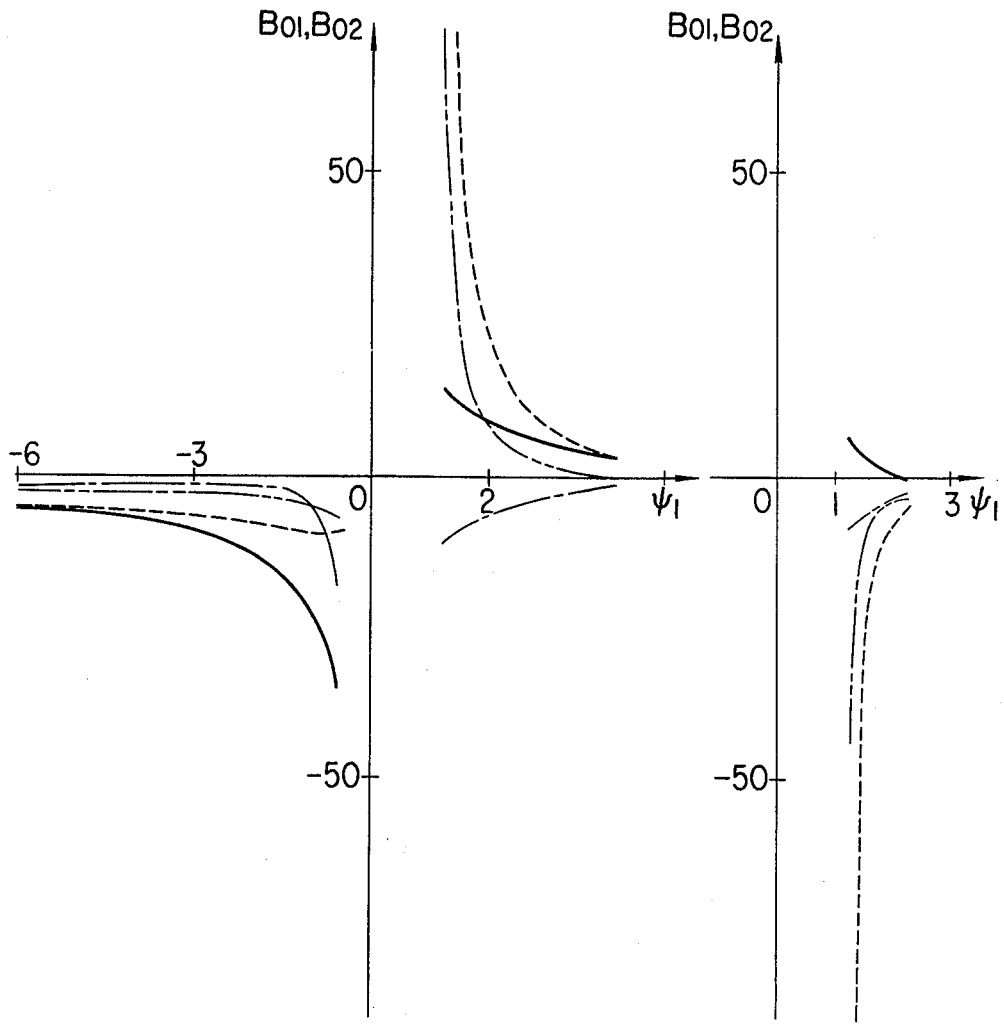
Figure 24:
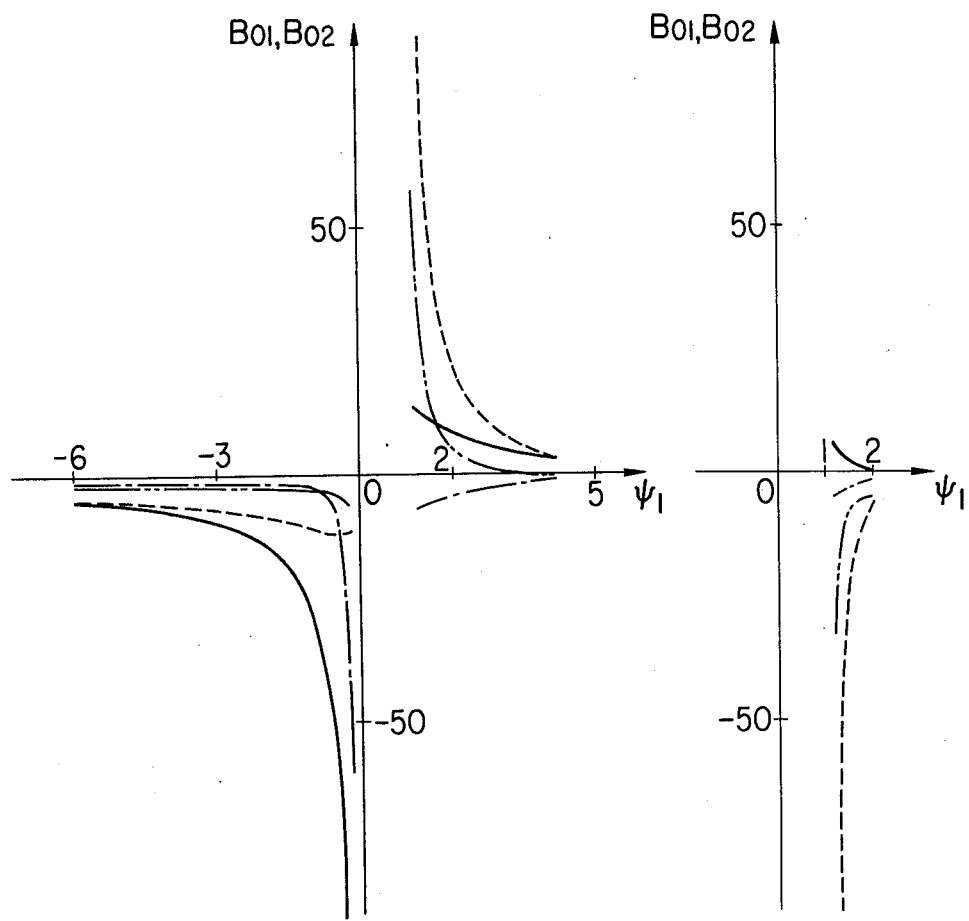
Figure 25:
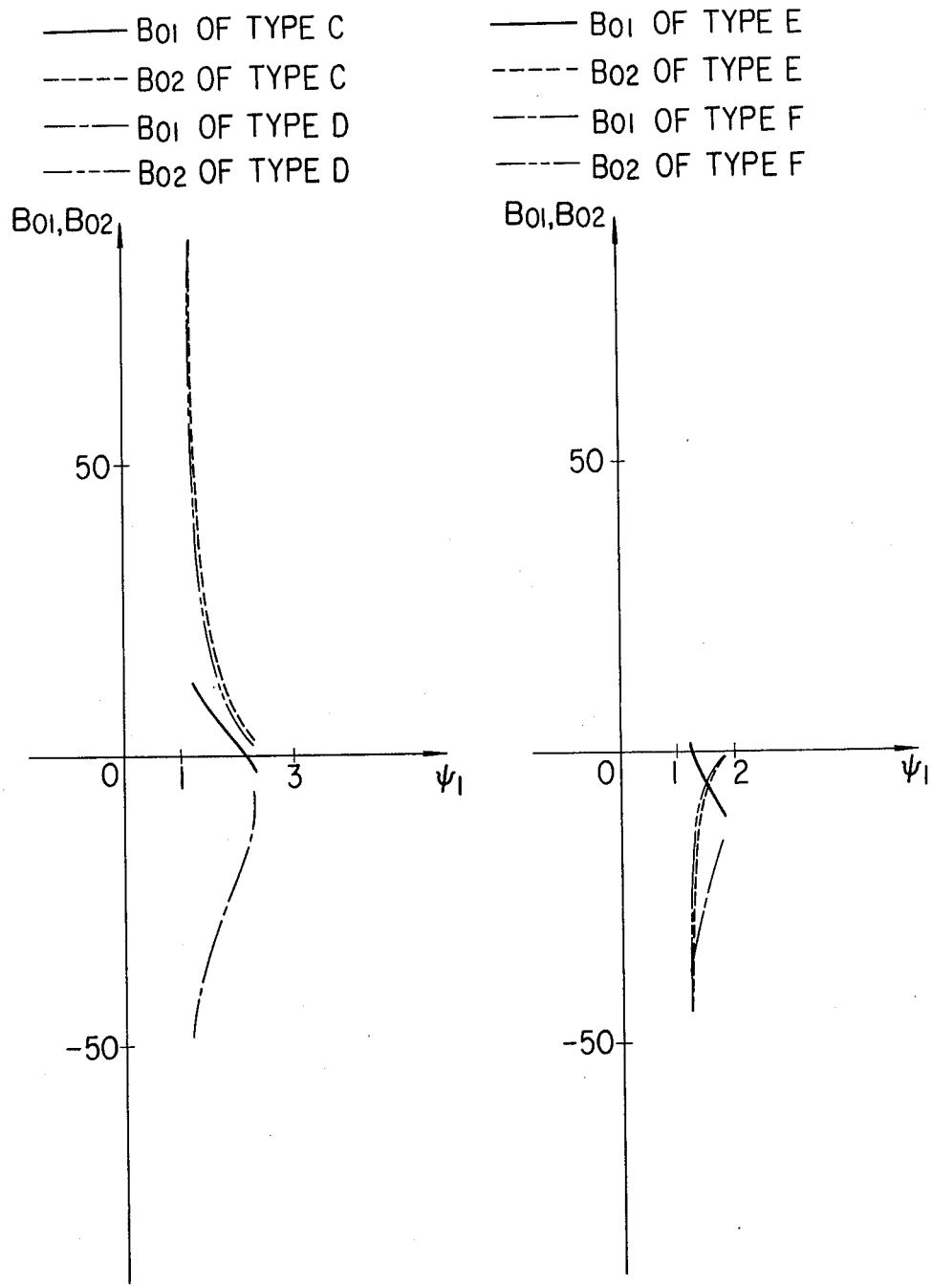
Figure 26:
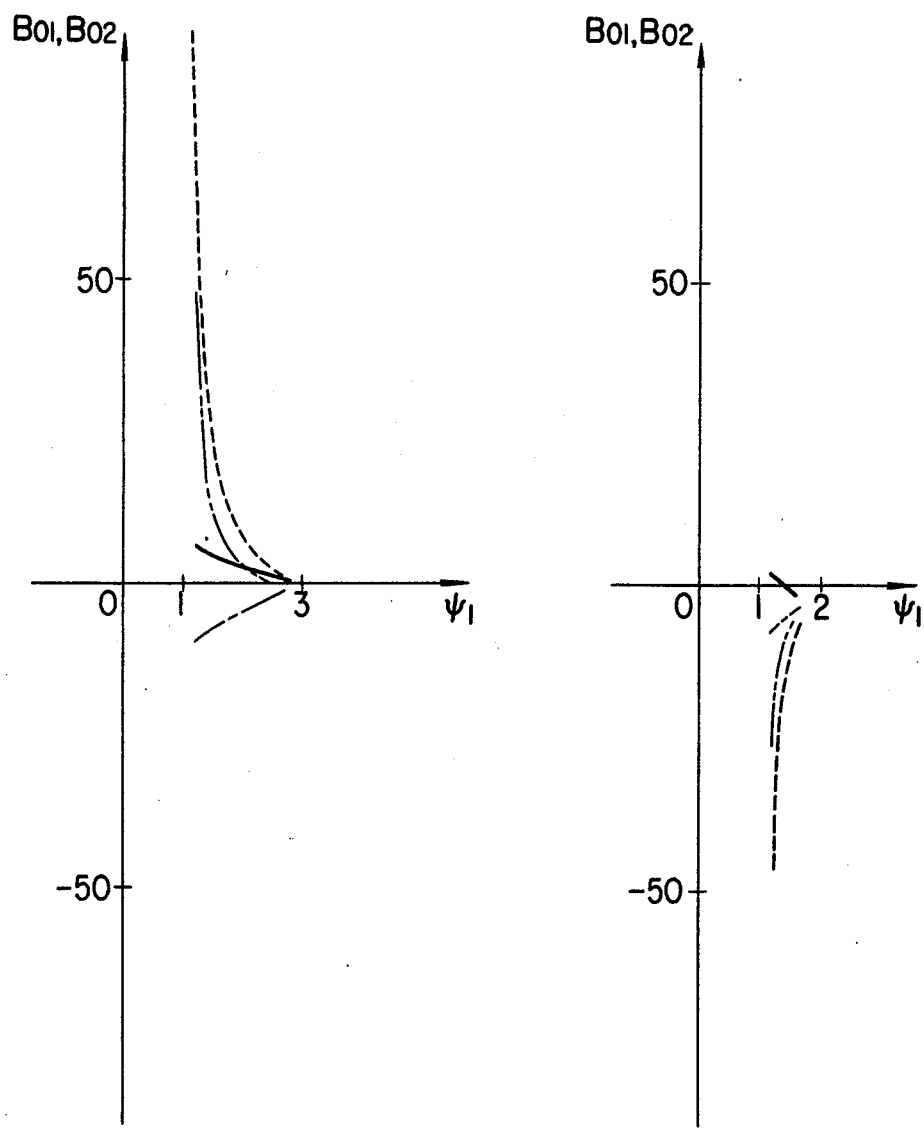
Figure 27:
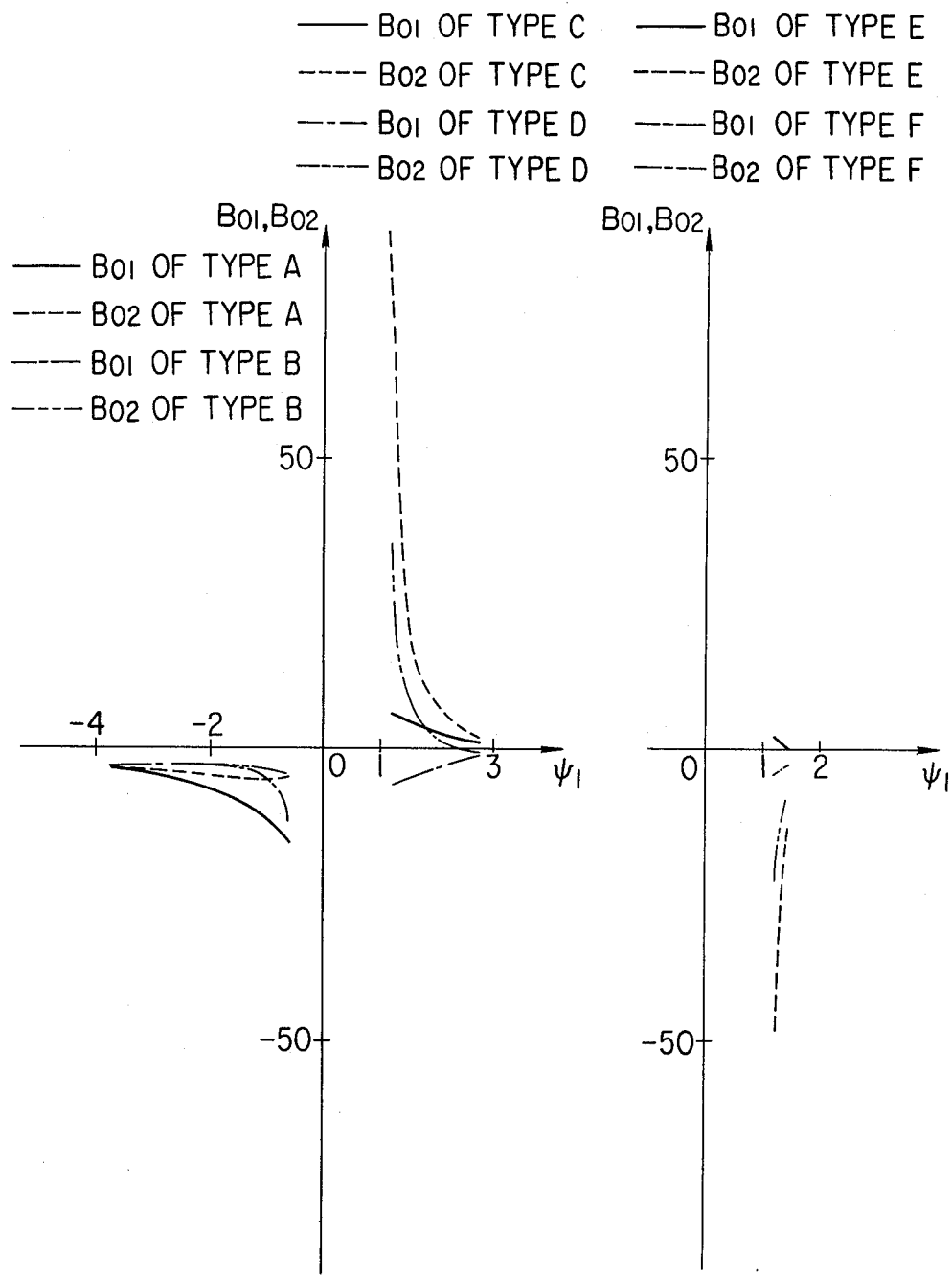
Figure 28:
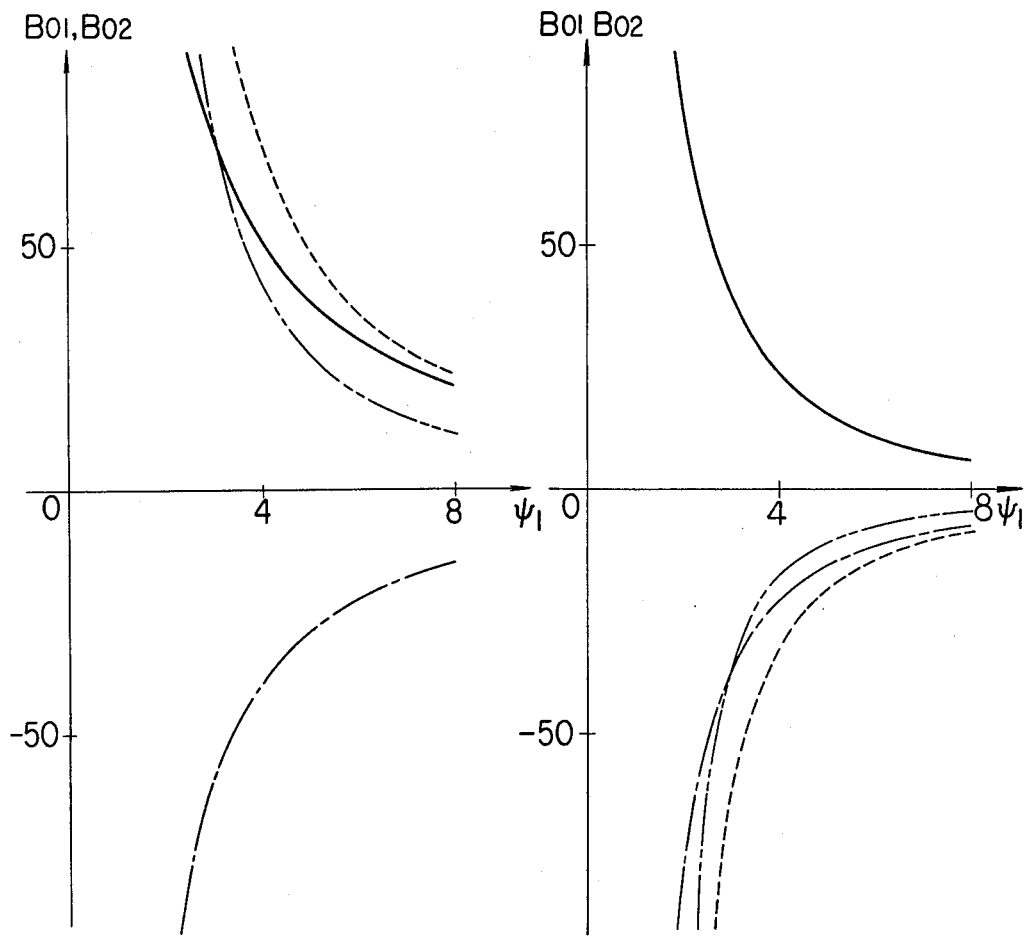
Figure 29:
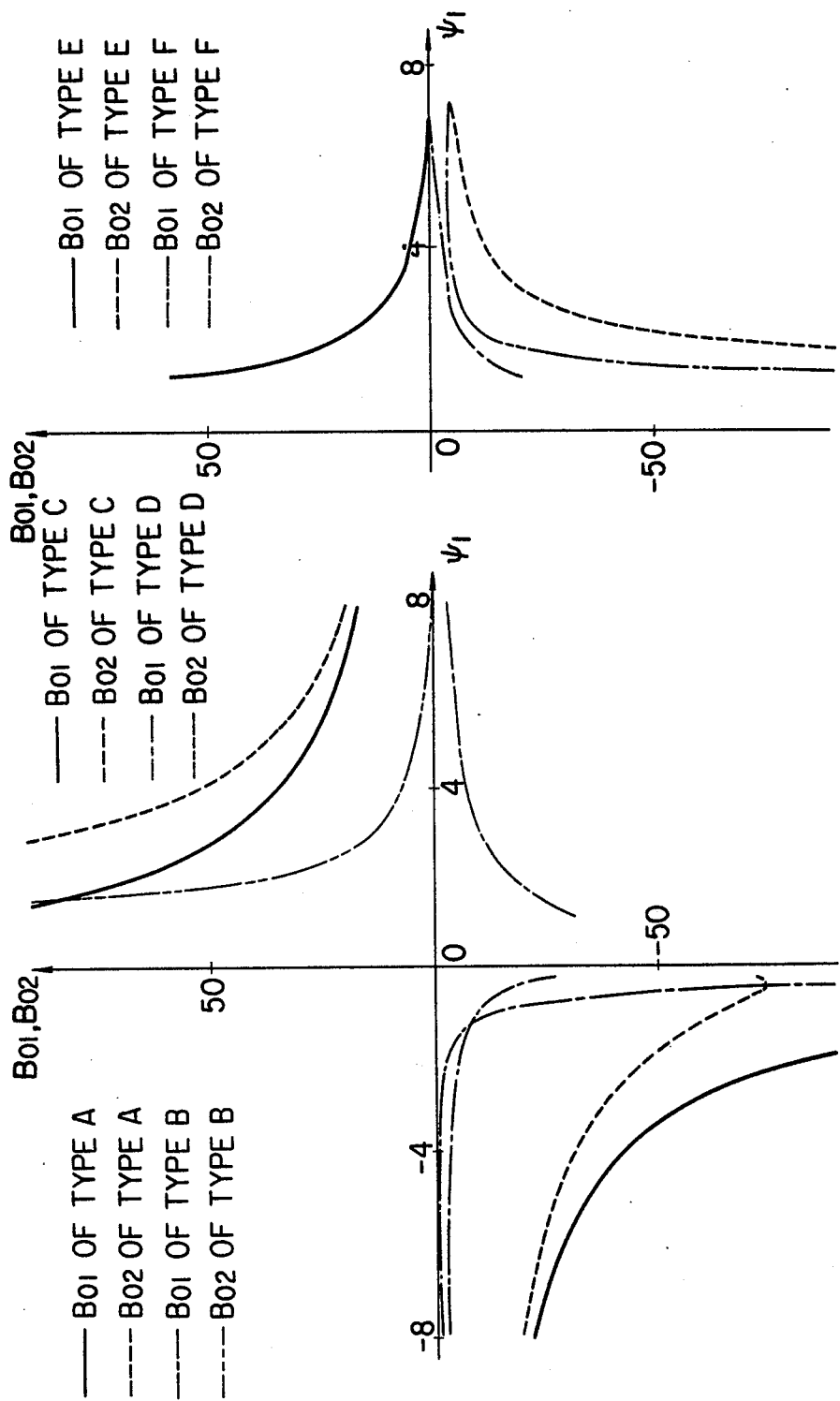
Figure 30:
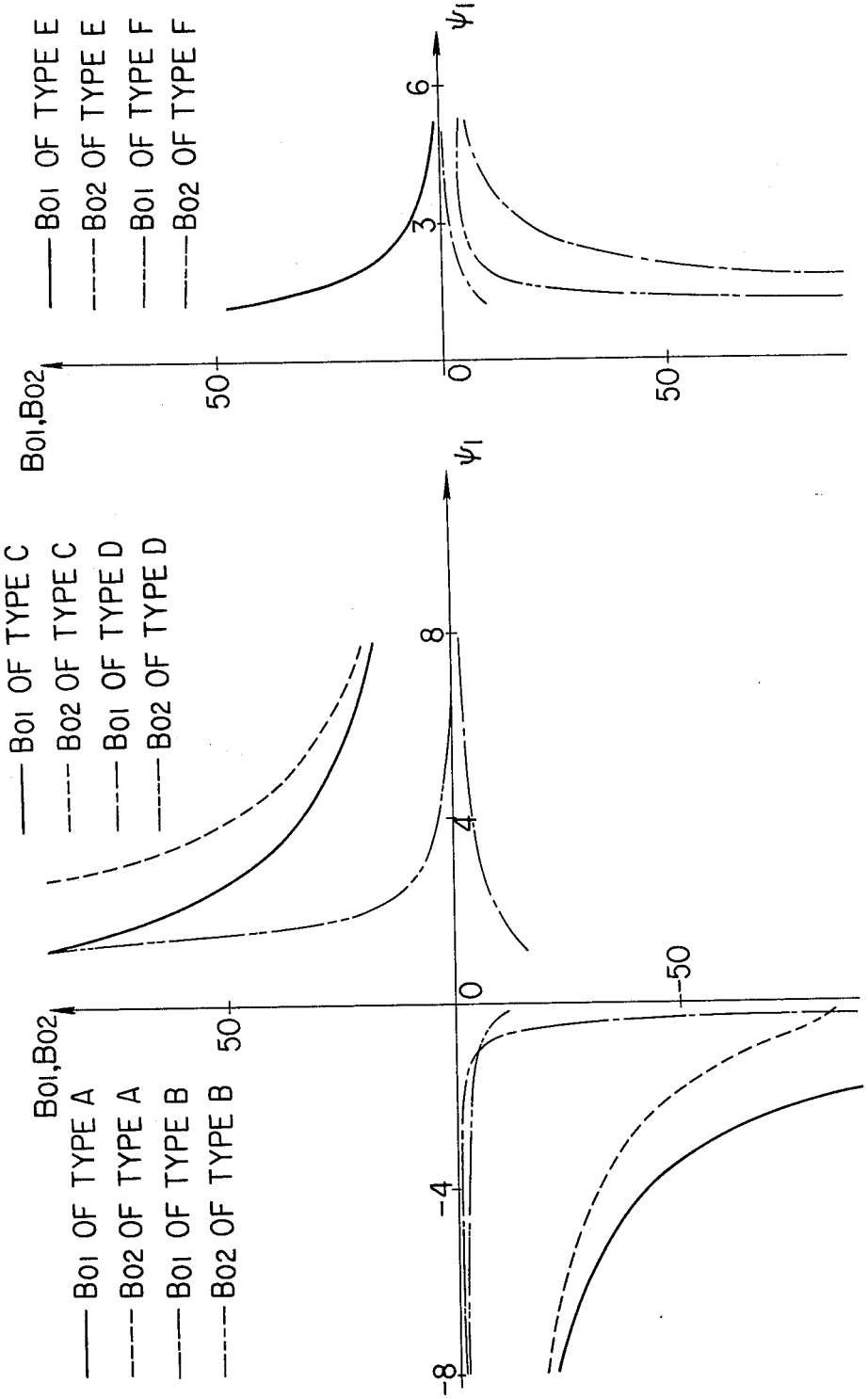
Figure 31:
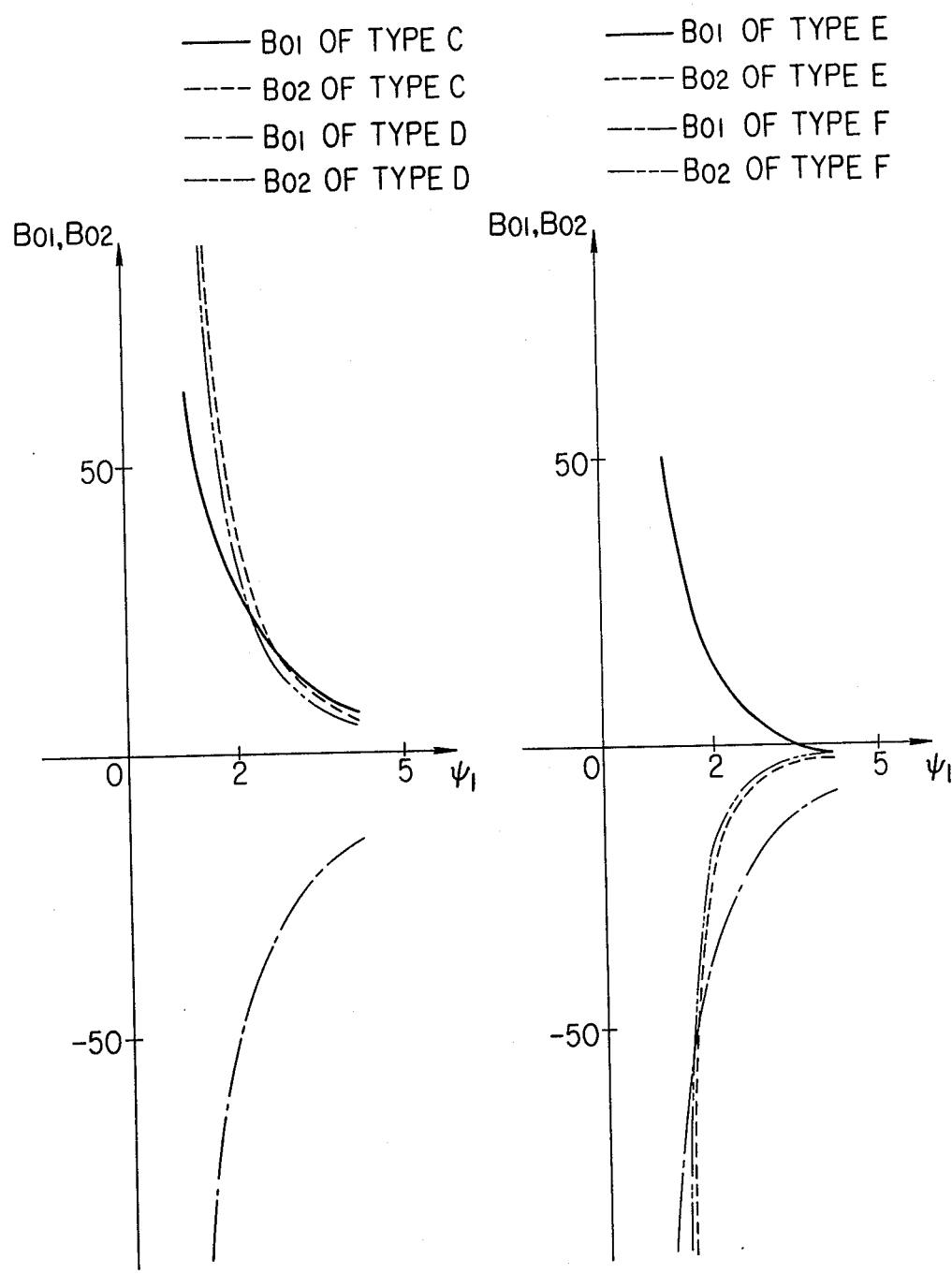
Figure 32:
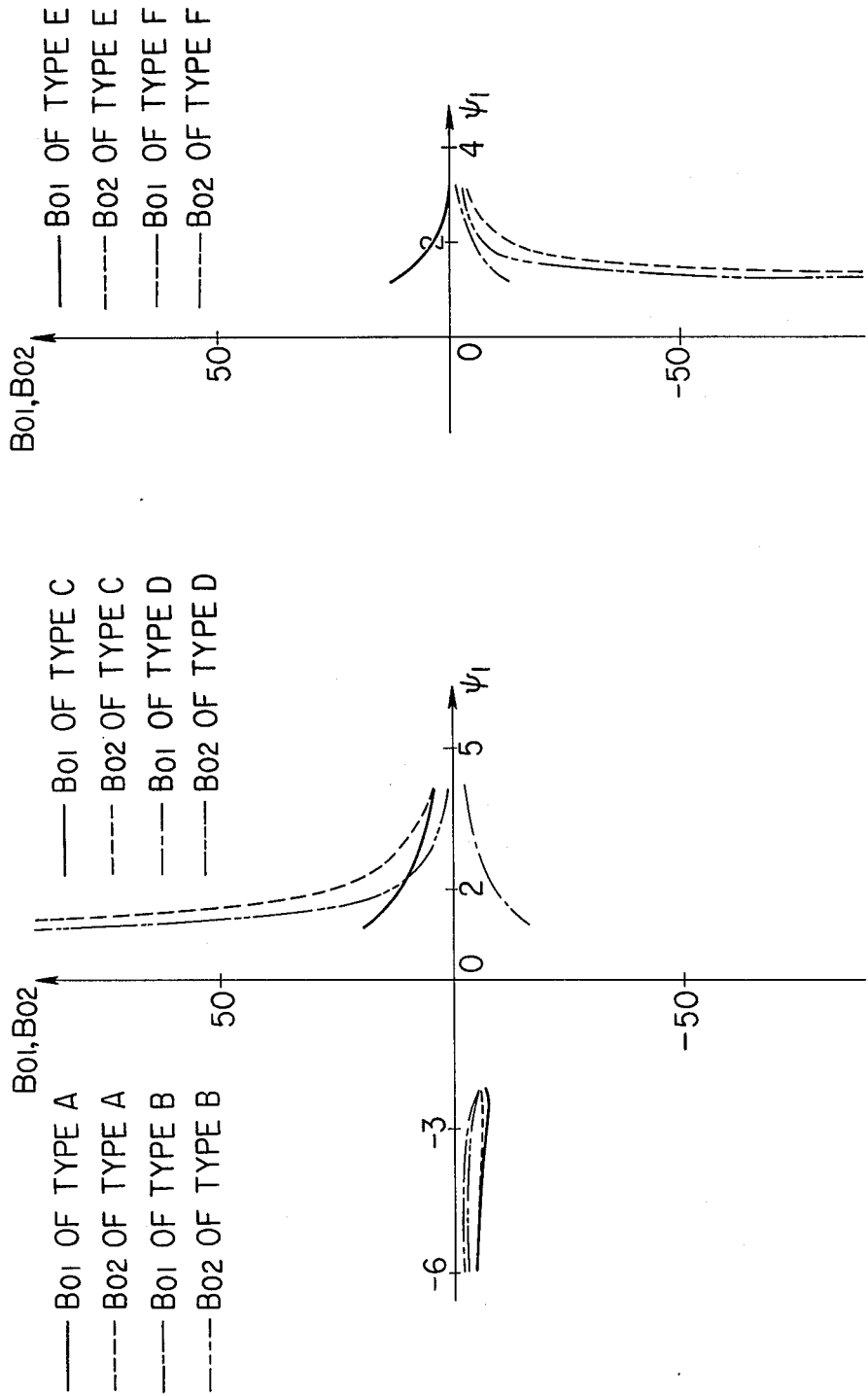
Figure 33:
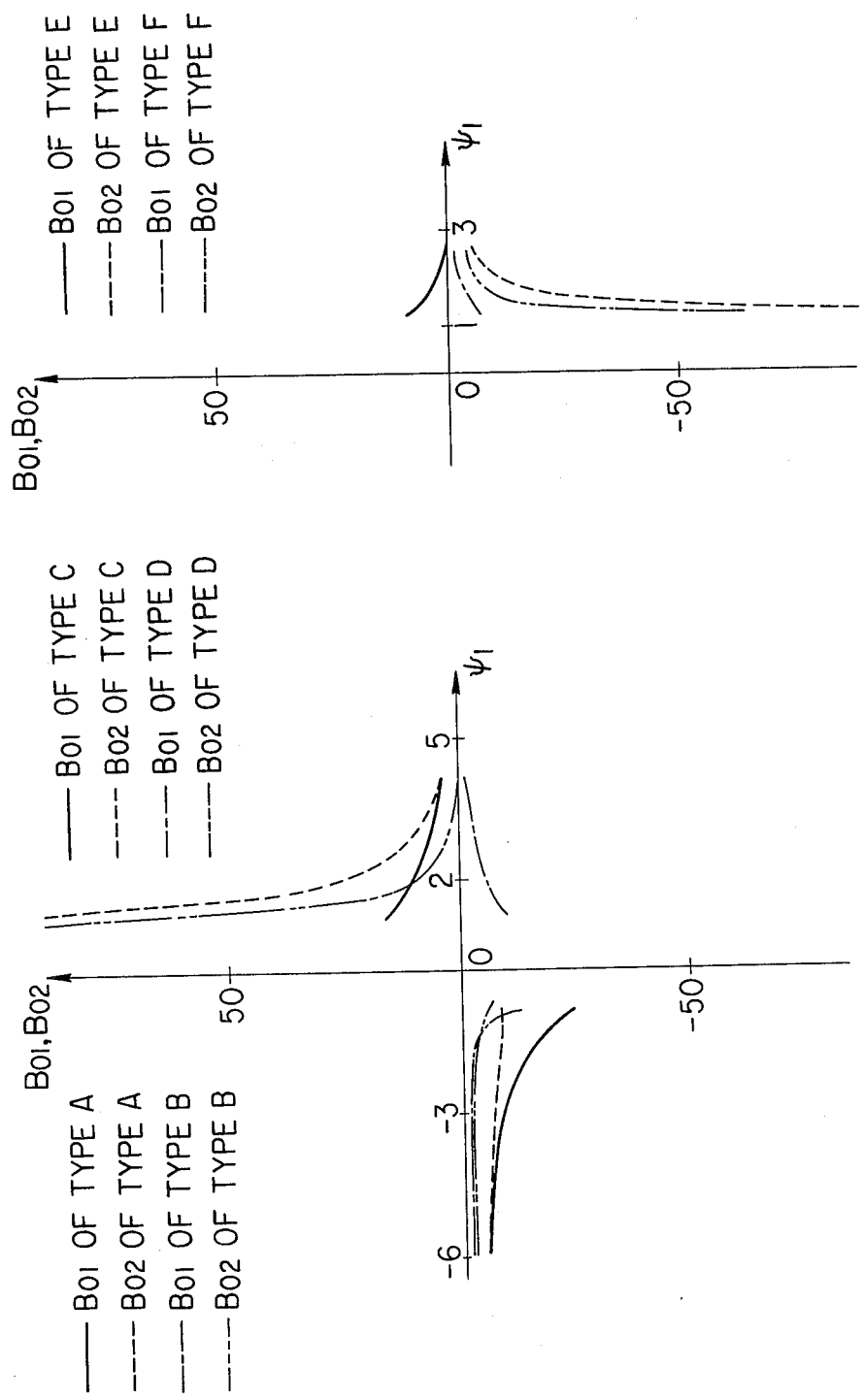
Figure 34:
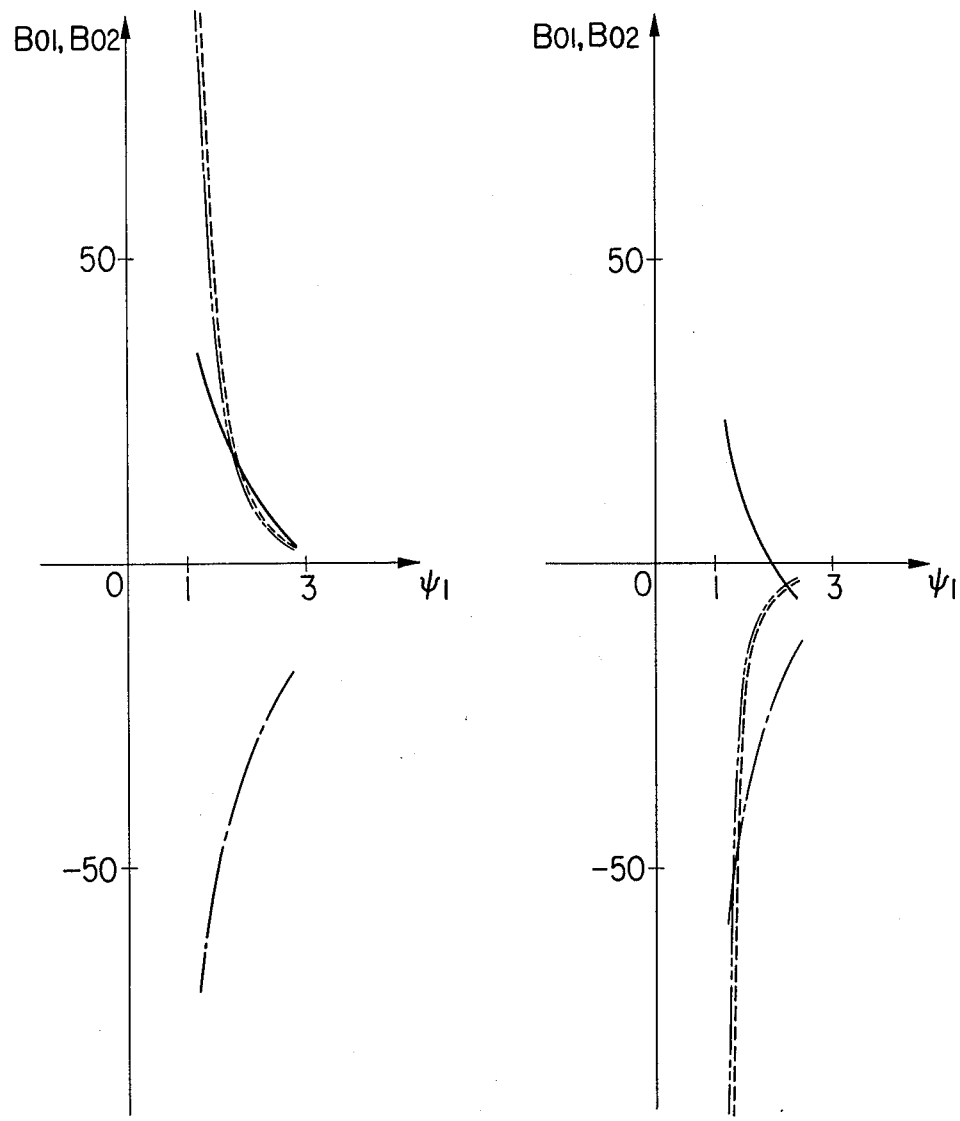
Figure 35:
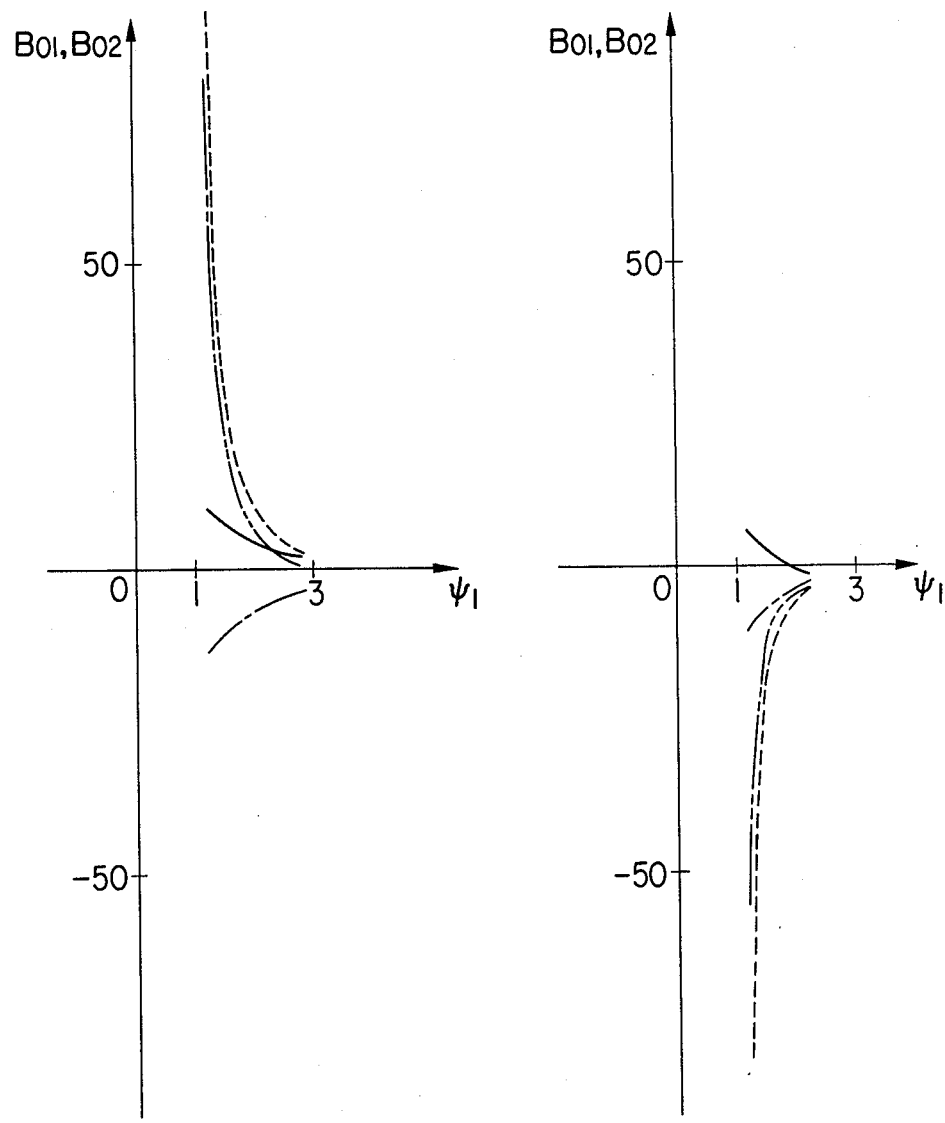
Figure 36:
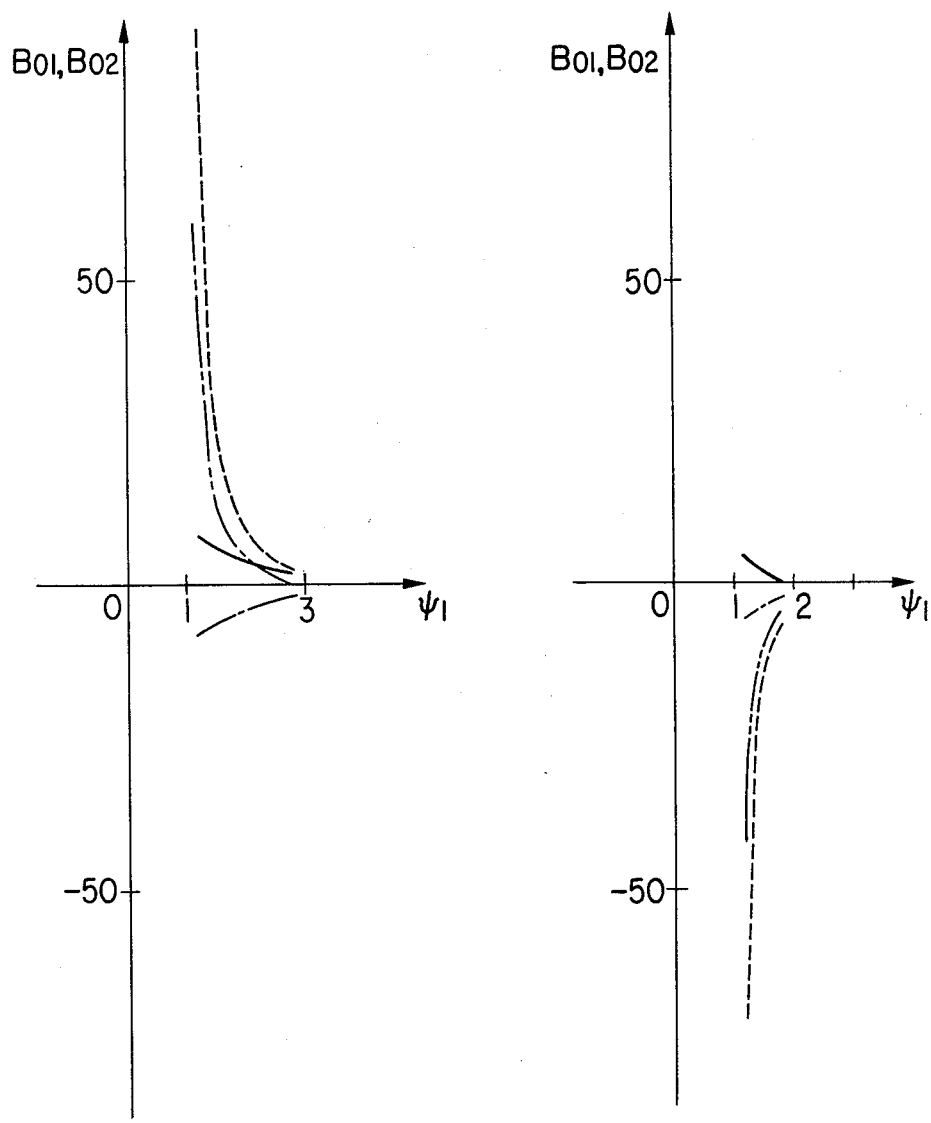
Figure 38:
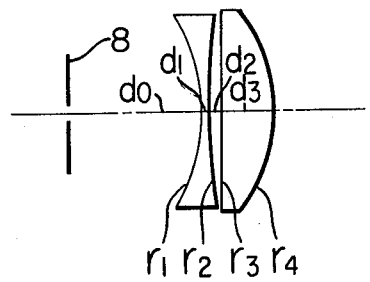
FIGS. 38, 39(A), 40, 41, 42, 43, 44, 45(A), 46, 47, 48, 49, 50, 51, 52, 53, 54, 55, 56, 57(A), 58, 59, 60, 61, 62(A), 63 and 64 show various embodiments of the focusing lens for scanning available for the information processing terminal unit.
Figure 39A:
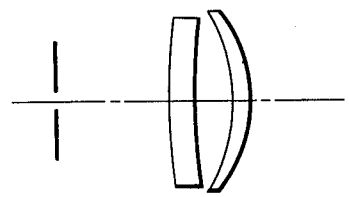
Figure 39B:
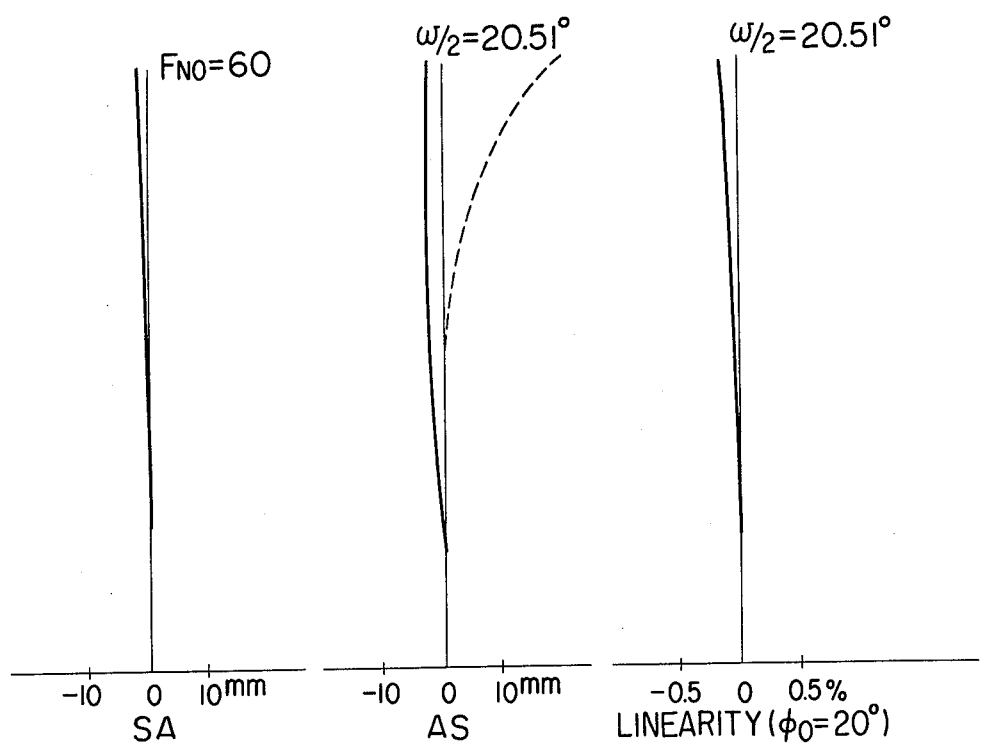
FIG. 39(B) illustrates various aberrations in the lens of FIG. 39(A).
Figure 40:
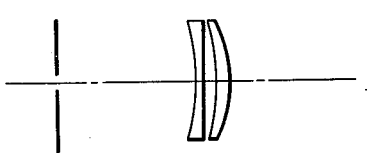

Referring to FIG. 8 which illustrates the power arrangement of the focusing lens, reference character 8 designates a deflecting surface which, as viewed from the lens system, is an entrance pupil, $t_1$ represents the distance from the entrance pupil to the principal point of the first partial system of the lens system, and $e'$ represents the distance between the principal points of the first and second partial systems. If $\psi_1$ is varied when $t_1$ and $e'$ are fixed, $\psi_2$ is also varied in accordance with equation (39). At the same time, Petzval sum $\underline{P}$ is varied in accordance with equation (39), as shown in FIG. 9. (Note that $t_1$ is not shown there because it is not related to $\underline{P}$. As to $N_1$ and $N_2$, assume that they are typically $N_1 = N_2 = 1.65$.) FIGS. 10 to 36 illustrate the variations in $B_{01}$ and $B_{02}$ provided by varying the power arrangement corresponding to the tolerance of $\underline{P}$ ($|P| \leq 1$) when the focal length of the entire system is 1, and by solving the quartic of equation (35), with respect to each power arrangement, with III = 0 and V = $\frac{2}{3}(1 - 1/2k^2)$ as the targets. FIGS. 10 – 18 refer to the case of the amplitude $\phi_o = 20°$ (V = −0.01725): FIG. 10 illustrates the variations in $B_{01}$ and $B_{02}$ provided by varying $\psi_1$ when $e' = 0.015$ and $t = 0.05$ ($\psi_2$ is determined by equation (39)); FIG. 11 illustrates those when $e' = 0.015$ and $t = 0.25$; FIG. 12 illustrates those when $e' = 0.015$ and $t = 0.4$; FIG. 13 illustrates those when $e' = 0.1$ and $t = 0.05$; FIG. 14 illustrates those when $e' = 0.1$ and $t = 0.25$; FIG. 15 illustrates those when $e' = 0.1$ and $t = 0.4$; FIG. 16 illustrates those when $e' = 0.2$ and $t = 0.05$; FIG. 17 illustrates those when $e' = 0.2$ and $t = 0.25$; FIG. 18 illustrates those when $e' = 0.2$ and $t = 0.4$. FIGS. 19 – 27 refer to the case of the amplitude $\phi_o = 15°$ (V = −0.5492): FIG. 19 illustrates the variations in $B_{01}$ and $B_{02}$ provided by varying $\psi_1$ when $e' = 0.015$ and $t = 0.05$; FIG. 20 illustrates those when $e' = 0.015$ and $t = 0.25$; FIG. 21 illustrates those when $e' = 0.015$ and $t = 0.4$; FIG. 22 illustrates those when $e' = 0.1$ and $t = 0.05$; FIG. 23 illustrates those when $e' = 0.1$ and $t = 0.25$; FIG. 24 illustrates those when $e' = 0.1$ and $t = 0.4$; FIG. 25 illustrates those when $e' = 0.2$ and $t = 0.05$; FIG. 26 illustrates those when $e' = 0.2$ and $t = 0.25$; and FIG. 27 illustrates those when $e' = 0.4$ and $t = 0.4$. FIGS. 28 to 36 refer to the case of the amplitude $\phi_o = 10°$ (V = −2.069): FIG. 28 illustrates the variations in $B_{01}$ and $B_{02}$ provided by varying $\psi_1$ when $e' = 0.015$ and $t = 0.05$; FIG. 29 illustrates those when $e' = 0.015$ and $t = 0.25$; FIG. 30 illustrates those when $e' = 0.05$ and $t = 0.4$; FIG. 31 illustrates those when $e' = 0.1$ and $t = 0.05$; FIG. 32 illustrates those when $e' = 0.1$ and $t = 0.25$; FIG. 33 illustrates those when $e' = 0.1$ and $t = 0.4$; FIG. 34 illustrates those when $e' = 0.2$ and $t = 0.05$; FIG. 35 illustrates those when $e' = 0.2$ and $t = 0.25$; and FIG. 36 illustrates those when $e' = 0.2$ and $t = 0.4$.

In FIGS. 10 to 36, it is seen that if the lens system comprises two partial systems each of which is a thin system, the lens system having the values of the third-order distortion coefficient III = 0 and V = $\frac{2}{3}(1 - 1/2k^2)$ is divided into two groups in the case of the negative-positive lens type and into four groups in the case of the positive-negative lens type. That is, types A, B, C, D, E and F in FIG. 10 are these groups and the shape of typical one of these groups is shown in FIG. 37.

Next, in the negative-positive lenses previously described, type A of the two groups is greater in value of $|B_0|$ than type B, that is, as is apparent from equation (25), it is greater in curvature $(1/r)$ so that aberrations of higher orders are difficult to correct. Likewise, in the positive-negative lenses, type C of the four groups is greater in value of $|B_0|$ than the other types so that aberrations of higher orders are difficult to correct. Thus, in the negative-positive lenses, type B is relatively small in value of $|B_0|$ and in the positive-negative lenses, three types D, E and F are relatively small in value of $|B_0|$, and these types are suited for practical use in that even if the lens system is increased in thickness, a wide angle of view can be secured without creating aberrations of higher orders.

More specifically, as to type B of the negative-positive lenses and types D, E and F of the positive-negative lenses, these are the systems in which the focal length is regularized to 1, and Table 4 shows the ranges of the power $\psi_1$ of the first partial system in FIG. 8, the power $\psi_2$ of the second partial system (once $\psi_1$ and $\psi_2$ are determined, the distance $e'$ between the principal points of the first and second partial systems is determined by equation (39) since the focal length of the lens system is regularized to 1), and the specific coefficient of the first partial system (once the specific coefficient of the first partial system is determined, that of the second partial system is determined by equation (32)).

Table 4

| Negative-Positive Lenses | Positive-Negative Lenses | | |
|---|---|---|---|
| Type B | Type D | Type E | Type F |
| $-5.5 \leq \psi_1 \leq -0.35$ | $1.35 \leq \psi_1 \leq 5.5$ | $1.35 \leq \psi_1 \leq 4.5$ | $1.35 \leq \psi_1 \leq 4.5$ |
| $1.2 \leq \psi_2 \leq 5.7$ | $-5.3 \leq \psi_2 \leq -0.4$ | $-4.3 \leq \psi_2 \leq -0.4$ | $-4.3 \leq \psi_2 \leq -0.4$ |
| $-10 \leq B_{01} \leq 3$ | $-13 \leq B_{01} \leq 0.5$ | $-2.5 \leq B_{01} \leq 4.0$ | $-12 \leq B_{01} \leq -0.2$ |

The ranges of $\psi_1$, $\psi_2$ and $B_{01}$ shown in Table 4 above are set by the following reasons.

(i) Setting of $\psi_1$ and $\psi_2$

If the upper limits of $\psi_1$ and $\psi_2$ are exceeded, the duty for the power of the first group in the lens system will be greater to create much of astigmatism of higher orders which in turn will aggravate the angle-of-view characteristic.

If the lower limits $\psi_1$ and $\psi_2$ are exceeded, the curvature of the lens system will be increased to create aberration of higher orders which in turn will aggravate the angle-of-view characteristic.

Also, $\psi_1$ and $\psi_2$ may assume any of the values given in Table 4, provided that Petzval sum does not exceed 1.

(ii) Setting of $B_{01}$

In types B, D and F, if the lower limits of $\psi_1$ and $\psi_2$ are exceeded, the curvature of the first group in the lens system will be sharper to create aberration of higher orders, which in turn will aggravate the angle-of-view characteristic.

In type E, if the lower limits of $\psi_1$ and $\psi_2$ are exceeded, there will be no shape for this type which will satisfy II and V at a time.

In type B, if the upper limits of $\psi_1$ and $\psi_2$ are exceeded, there will be no shape for concavo-convexity which will satisfy II and V at a time.

In types D and F, if the upper limits of $\psi_1$ and $\psi_2$ are exceeded, there will be no shape for these types which will satisfy II and V at a time.

In type E, if the upper limits of $\psi_1$ and $\psi_2$ are exceeded, the curvature of the first group in the lens system will be sharper to create aberration of higher orders, which in turn will aggravate the angle-of-view characteristic.

The distance $e'$ between the principal points of the first and second partial systems is determined from equation (39) by setting $\psi_1$ and $\psi_2$ within the tolerance of P.

Also, $t$ is a quantity which is not related to the Petzval sum and there is a problem of dimension that as $t$ is greater, the outer diameter of the lens is greater and if $t$ is too small, the lens strikes against the deflector. Therefore, by setting the ranges of Table 4, it is possible to set $t$ as desired in the relation with the space.

Data of the focusing lens for scanning used with the device of FIG. 6 will now be shown.

A third to a sixth embodiment are the lenses falling within the above-described type B and the shapes of the lenses corresponding to these embodiments are shown in FIGS. 38 to 41. A seventh to a fifteenth embodiment are the lenses falling within the above-described type D and the shapes of the lenses corresponding to these embodiments are shown in FIGS. 42 to 50. A sixteenth to a twenty-second embodiment are the lenses falling within the above-described type E and the shapes of the lenses corresponding to these embodiments are shown in FIGS. 41 to 57. A twenty-third to a twenty-ninth embodiment are the lenses falling within the above-described type F and the shapes of the lenses corresponding to these embodiments are shown in FIGS. 58 to 64. A graph of aberrations is shown for one of the embodiments of each type, namely, for the fourth embodiment of type B, for the tenth embodiment of type D, for the twenty-second embodiment of type E, and for the twenty-seventh embodiment of type F.

In the data of lenses shown below, $r$ represents the curvature radius of each lens surface, $d$ represents the axial air space or the axial thickness of each lens, and especially $d_0$ represents the space between the deflecting surface (entrance pupil) and the lens surface $r_1$. $n$ represents the refractive index of each lens, $f$ the focal length of the entire lens system, FND the F-number of each lens, and $\omega/2$ a half angle of view of each lens. $\underline{E}$ represents the scanning efficiency and is defined by $(\omega/2)/2\phi_0$. As already noted, $\phi_0$ is the amplitude of the deflector, and V the target distortion coefficient determined by equation (21).

In each graph of aberrations, SA represents spherical aberration, AS represents astigmatism and linearity is defined by $$\text{linearity (\%)} = \frac{y' - f\phi_O \sin^{-1}\left(\frac{\theta}{2\phi_O}\right)}{f \cdot \phi_O \sin^{-1}\left(\frac{\theta}{2\phi_O}\right)} \times 100$$

where $y'$ is the image height of the principal ray actually passed through the lens, and the deviation thereof from $f \cdot \phi \cdot \sin^{-1}(\theta/2\phi_0)$ is represented by the linearity.

Type B

Third Embodiment (FIG. 38)
$\phi_0 = 20°$  (V = −0.01725)
$f = 300$, $F_{NO} = 60$, $\omega/2 = 27.02°$, E = 0.6755
$r_1 = -60.3868$, $d_0 = 44.7745$
$r_2 = 468.7497$, $d_1 = 2.9778$, $n_1 = 1.71159$
$r_3 = -4788.9738$, $d_2 = 3.8527$
$r_4 = -55.239$, $d_3 = 15.9289$, $n_2 = 1.77993$

| | $\psi$ | $e$ | $\beta_{01}$ | I = 105.6268, | P = 0.0208 |
|---|---|---|---|---|---|
| 1st Part System | −4.0002 | 0.0481 | −0.433 | II = 9.0495, | V = 0.2185 |
| 2nd Part System | 4.9134 | | −2.3055 | III = −0.0459 | |

Fourth Embodiment (FIG. 39A, aberrations in FIG. 39B)
$\phi_0 = 20°$  (V = −0.01725)
$f = 300$, $F_{NO} = 60$, $\omega/2 = 20.5°$, E = 0.5125
$r_1 = 296.8618$, $d_0 = 39.1781$
$r_2 = 173.2156$, $d_1 = 7.6284$, $n_1 = 1.56716$
$r_3 = -62.9508$, $d_2 = 12.0181$
$r_4 = 48.1409$, $d_3 = 6.6132$, $n_2 = 1.77975$

| | $\psi$ | $e$ | $\beta_{01}$ | I = 120.4932, | P = 0.3812 |
|---|---|---|---|---|---|
| 1st Part System | −0.4 | 0.0609 | −6.8093 | II = 9.6542, | V = 0.0133 |
| 2nd Part System | 1.3667 | | −8.7935 | III = −0.0445 | |

Fifth Embodiment (FIG. 40)
$\phi_0 = 15°$  (V = −0.5492)
$f = 300$, $F_{NO} = 60$, $\omega/2 = 19.54°$, E = 0.6513
$r_1 = -80.5068$, $d_0 = 45.1773$
$r_2 = -598.2344$, $d_1 = 2.023$, $n_1 = 1.77764$
$r_3 = -65.978$, $d_2 = 3.6669$
$r_4 = -35.3681$, $d_3 = 3.8509$, $n_2 = 1.78239$

| | $\psi$ | $e$ | $\beta_{01}$ | I = 318.4295, | P = 0.3166 |
|---|---|---|---|---|---|
| 1st Part System | −2.5031 | 0.0313 | 0.0398 | II = 24.1083, | V = −0.4321 |

-continued

| | | | | |
|---|---|---|---|---|
| 2nd Part System | 3.2484 | | −4.4629 III= −0.4147 | |

Figure 41:
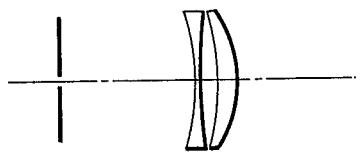

Sixth Embodiment (FIG. 41)

$\phi_0 = 15°$  (V = 0 −0.5492)
$f = 300$, $F_{NO} = 60$,  $\omega/2 = 19.92°$, E = 0.664
$r_1 = -85.5401$,  $d_0 = 44.9353$
$r_2 = 1321.8116$,  $d_1 = 1.7126$,  $n_1 = 1.6078$
$r_3 = -70.354$,  $d_2 = 6.008$
$r_4 = -38.5754$,  $d_3 = 5.7469$,  $n_2 = 1.78203$

| | $\psi$ | e | $\beta_{01}$ | I = 277.2354, | P = 0.1299 |
|---|---|---|---|---|---|
| 1st Part System | −2.27 | 0.0454 | −0.14 | II = 21.8472, | V = −0.4133 |
| 2nd Part System | 2.9643 | | −4.5238 | III = −0.4776 | |

Type D

Figure 42:
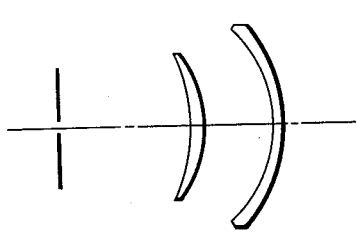

Seventh Embodiment (FIG. 42)

$\phi_0 = 20°$  (V = −0.01725)
$f = 300$, $F_{NO} = 60$,  $\omega/2 = 26.82°$, E = 0.6705
$r_1 = -49.5354$,  $d_0 = 42.7642$
$r_2 = -39.3573$,  $d_1 = 3.5033$,  $n_1 = 1.77999$
$r_3 = -44.8612$,  $d_2 = 24.8992$
$r_4 = -51.8628$,  $d_3 = 1.3833$,  $n_2 = 1.51035$

| | $\psi$ | e | $\beta_{01}$ | I = 154.3932, | P = 0.3812 |
|---|---|---|---|---|---|
| 1st Part System | 1.4058 | 0.04 | −10.0248 | II = 6.7644, | V = 0.0926 |
| 2nd Part System | −0.43 | | 21.1644 | III = −0.1592 | |

Figure 43:
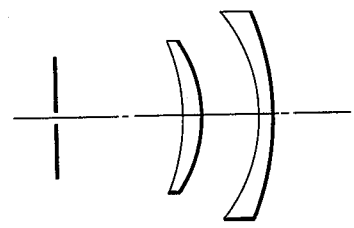

Eighth Embodiment (FIG. 43)

$\phi_0 = 20°$  (V = 0.01725)
$f = 300$, $F_{NO} = 60$,  $\omega/2 = 26.88°$, E = 0.672
$r_1 = -72.0653$,  $d_0 = 42.4586$
$r_2 = -44.0406$,  $d_1 = 6.1245$,  $n_1 = 1.77891$
$r_3 = -50.5535$,  $d_2 = 19.3514$
$r_4 = -95.2798$,  $d_3 = 3.7201$,  $n_2 = 1.51005$

| | $\psi$ | e | $\beta_{01}$ | I = 169.5434, | P = 0.219 |
|---|---|---|---|---|---|
| 1st Part System | 2.2607 | 0.0385 | −5.4356 | II = 6.2104, | V = 0.114 |
| 2nd Part System | −1.3809 | | 3.9819 | III = −0.0776 | |

Figure 44:
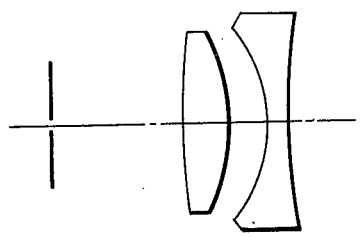

Ninth Embodiment (FIG. 44)

$\phi_0 = 20°$  (V = −0.01725)
$f = 300$, $F_{NO} = 60$,  $\omega/2 = 26.41°$, E = 0.6603
$r_1 = 319.5936$,  $d_0 = 43.0598$
$r_2 = -56.8203$,  $d_1 = 15.2132$,  $n_1 = 1.65554$
$r_3 = -47.2863$,  $d_2 = 12.9041$
$r_4 = 308.9742$,  $d_3 = 7.9597$,  $n_2 = 1.5111$

| | $\psi$ | e | $\beta_{01}$ | I = 84.1653, | P = −0.012 |
|---|---|---|---|---|---|
| 1st Part System | 4.0101 | 0.05 | −2.1561 | II = −1.3442, | V = −0.0079 |
| 2nd Part System | −3.7668 | | −0.1368 | III = 0.0039 | |

Figure 45A:
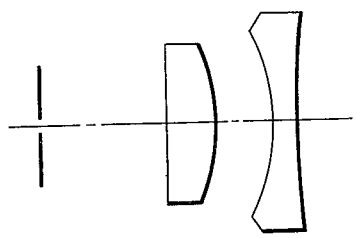
Figure 45B:
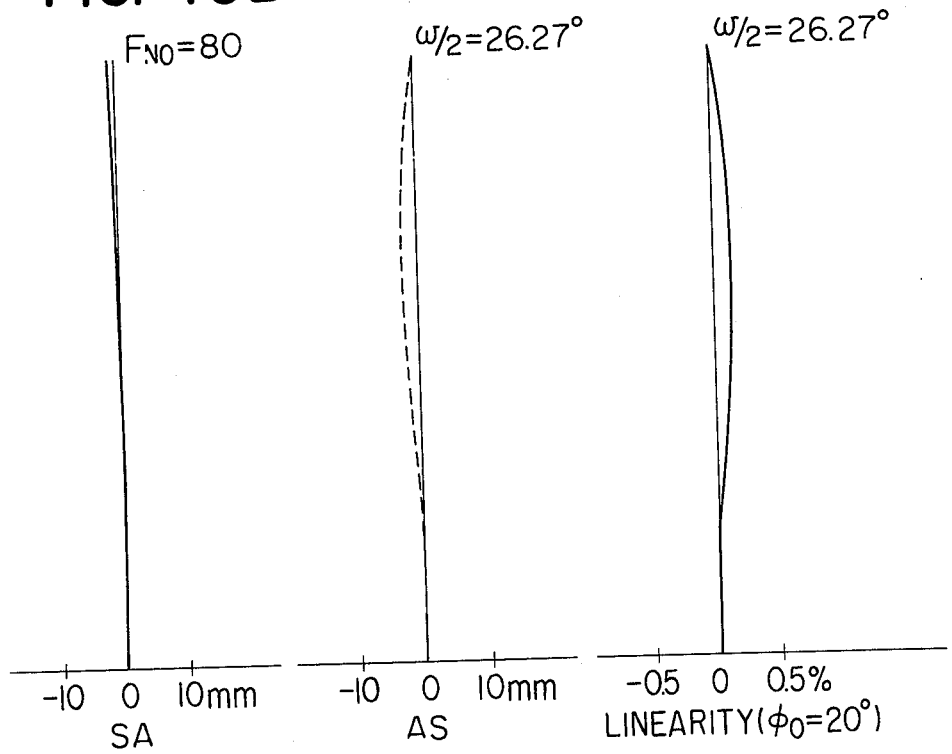
FIG. 45(B) illustrates various aberrations in the lens of FIG. 45(A).

Tenth Embodiment (FIG. 45A, aberrations in FIG. 45B)

$\phi_0 = 20°$  (V = 0.01725)
$f = 300$, $F_{NO} = 60$,  $\omega/2 = 0\ 26.27°$, E = 0.6568
$r_1 = 2784.2869$,  $d_0 = 42.1194$
$r_2 = -63.5345$,  $d_1 = 15.6796$,  $n_1 = 1.70932$
$r_3 = -56.2483$,  $d_2 = 19.9774$
$r_4 = 383.5802$,  $d_3 = 8.4216$,  $n_2 = 1.51548$

| | $\psi$ | e | $\beta_{01}$ | I = 99.297, | P = −0.076 |
|---|---|---|---|---|---|
| 1st Part System | 3.4178 | 0.0696 | −2.3598 | II = −0.0761, | V = −0.0684 |
| 2nd Part System | −3.1729 | | −0.1499 | III = 0.1162 | |

Figure 46:
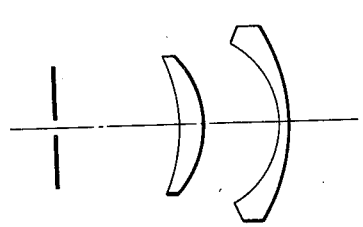

Eleventh Embodiment (FIG. 46)

$\phi_0 = 15°$  (V = −0.5492)
$f = 300$, $F_{NO} = 60$,  $\omega/2 = 25.26°$, E = 0.842
$r_1 = -52.2902$,  $d_0 1\ 41.4482$
$r_2 = -29.0321$,  $d_1 = 7.8791$,  $n_1 = 1.59108$
$r_3 = -29.9117$,  $d_2 = 24.6423$
$r_4 = -60.3365$,  $d_3 = 2.916$,  $n_2 = 1.51002$

| | $\psi$ | e | $\beta_{01}$ | I = 541.0695, | P = −0.0007 |
|---|---|---|---|---|---|
| 1st Part System | 3.0581 | 0.0573 | −6.1309 | II = 31.2753, | V = −0.397 |
| 2nd Part System | −2.4955 | | 3.5027 | III = −0.1101 | |

Figure 47:
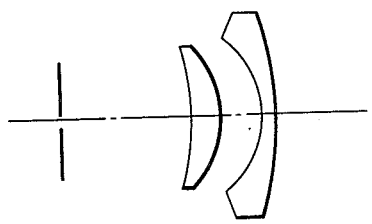

Twelfth Embodiment (FIG. 47)

$\phi_0 = 15°$  (V = −0.5492)
$f = 300$, $F_{NO} = 60$,  $\omega/2 = 25.81°$, E = 0.8603
$r_1 = -115.8647$,  $d_0 = 42.726$
$r_2 = -33.6996$,  $d_1 = 10.1089$,  $n_1 = 1.626$
$r_3 = -31.4955$,  $d_2 = 14.9202$
$r_4 = -132.0856$,  $d_3 = 2.972$,  $n_2 = 1.52276$

| | $\phi$ | e | $\beta_{01}$ | I = 382.3233, | P = −0.0598 |
|---|---|---|---|---|---|
| 1st Part System | 4.1386 | 0.0396 | −3.6556 | II = 18.9434, | V = −0.1969 |
| 2nd Part System | −3.7531 | | 1.2485 | III = −0.0616 | |

Figure 48:
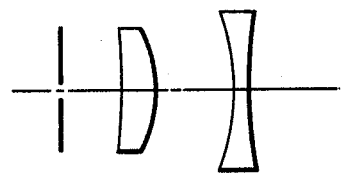

Thirteenth Embodiment (FIG. 48)

$\phi_0 = 15°$  (V = −0.5492)
$f = 300$, $F_{NO} = 60$,  $\omega/2 = 24.63°$, E = 0.821
$r_1 = -245.25$,  $d_0 = 20.$
$r_2 = -43.605$,  $d_1 = 10.95$,  $n_1 = 1.6077$
$r_3 = -80.045$,  $d_2 = 26.15$
$r_4 = 140.85$,  $d_3 = 6.64$,  $n_2 = 1.6077$

| | $\psi$ | e | $\beta_{01}$ | I = 348.3041, | P = −0.0834 |
|---|---|---|---|---|---|
| 1st Part System | 3.5017 | 0.0875 | −3.5017 | II = −0.1389, | V = −0.6503 |
| 2nd Part System | −3.6059 | | −0.9437 | III = 0.198 | |

Figure 49:
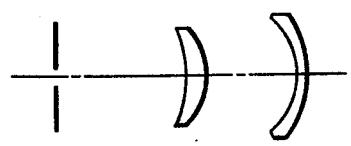

Fourteenth Embodiment (FIG. 49)

$\phi_0 = 10°$  (V = −2.069)
$f = 300$, $F_{NO} = 60$,  $\omega/2 = 14.12°$, E = 0.706
$r_1 = -35.6653$,  $d_0 = 43.8408$
$r_2 = -21.7994$,  $d_1 = 5.2267$,  $n_1 = 1.50763$
$r_3 = -22.341$,  $d_2 = 31.034$
$r_4 = -31.5748$,  $d_3 = 2.8744$,  $n_2 = 1.78016$

| | $\psi$ | e | $\beta_{01}$ | I = 1028.8103, | P = 0.0805 |
|---|---|---|---|---|---|
| 1st Part System | 3.0607 | 0.0723 | −8.1212 | II = 74.583, | V = −1.5861 |

-continued

| | | | | | |
|---|---|---|---|---|---|
| 2nd Part System | −2.6457 | | 4.5634 | III= | 0.0768 |

Figure 50:
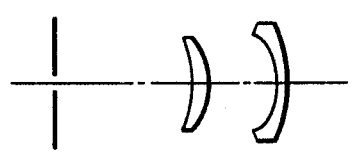

Fifteenth Embodiment (FIG. 50)

$\phi_0 = 10°$, $f = 300$, $F_{NO} = 60$, (V = −2.069), $\omega/2 = 14.13°$ E = 0.7065

$r_1 = -42.4288$, $d_0 = 44.8537$
$r_2 = -21.5206$, $d_1 = 5.264$, $n_1 = 1.51299$
$r_3 = -20.0884$, $d_2 = 22.7283$
$r_4 = -40.1905$, $d_3 = 2.7712$, $n_2 = 1.51056$

| | $\psi$ | e | $\beta_{01}$ | I = 1085.6728, | P = −0.1955 |
|---|---|---|---|---|---|
| 1st Part System | 3.8235 | 0.0584 | −6.282 | II = 75.1292, | V = −1.579 |
| 2nd Part System | −3.6347 | | 3.5497 | III = −0.1103, | |

Type E

Figure 51:
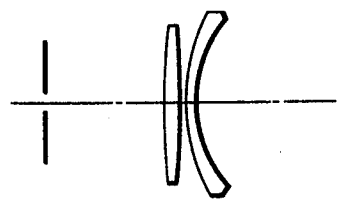

Sixteenth Embodiment (FIG. 51)

$\phi_0 = 20°$, $f = 300$, $F_{NO}\ 60$, (V = −0.01725), $\omega/2 = 26.31°$, E = 0.6578

$r_1 = 198.8838$, $d_0 = 38.8588$
$r_2 = -1092.9751$, $d_1 = 4.4237$, $n_1 = 1.77992$
$r_3 = 62.6797$, $d_2 = 2.8915$
$r_4 = 54.9593$, $d_3 = 2.9212$, $n_2 = 1.7659$

| | $\phi$ | e | $\beta_{01}$ | I = −4.0754, | P = 0.4896 |
|---|---|---|---|---|---|
| 1st Part System | 1.3882 | 0.0703 | −0.5878 | II = −3.6418, | V = 0.1438 |
| 2nd Part System | −0.4302 | | −16.8636 | III = −0.0207 | |

Figure 52:
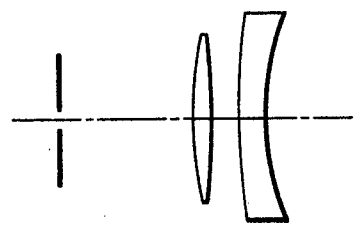

Seventeenth Embodiment (FIG. 52)

$\phi_0 = 20°$, $f = 300$, $F_{NO} = 60$, (V = −0.01725), $\omega/2 = 25.78°$, E = 0.6445

$r_1 = 171.3399$, $d_0 = 43.8845$
$r_2 = -290.1454$, $d_1 = 6.3061$, $n_1 = 1.78002$
$r_3 = 275.0705$, $d_2 = 9.6543$
$r_4 = 79.5611$, $d_3 = 8.0766$, $n_2 = 1.5104$

| | $\psi$ | e | $\beta_{01}$ | I = 16.5008, | P = 0.3147 |
|---|---|---|---|---|---|
| 1st Part System | 2.1593 | 0.0651 | −1.0232 | II = 1.4619, | V = −0.0856 |
| 2nd Part System | −1.3488 | | −4.2844 | III = 0.0488 | |

Figure 53:
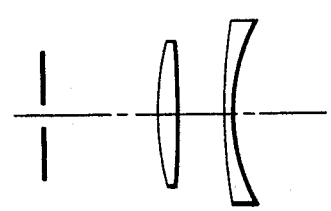

Eighteenth Embodiment (FIG. 53)

$\phi_0 = 15°$, $f = 300$, $F_{NO} = 60$, (V = −0.5492), $\omega/2 = 24.23°$, E = 0.8077

$r_1 = 98.7412$, $d_0 = 38.7525$
$r_2 = -1162.5637$, $d_1 = 5.4247$, $n_1 = 1.78001$
$r_3 = 184.789$, $d_2 = 16.1757$
$r_4 = 55.3385$, $d_3 = 2.9061$, $n_2 = 1.51069$

| | $\psi$ | e | $\beta_{01}$ | I = 15.5054, | P = 0.1607 |
|---|---|---|---|---|---|
| 1st Part System | 2.5668 | 0.0725 | −0.4365 | II = −1.2606, | V = −0.4904 |
| 2nd Part System | −1.9251 | | −4.3493 | III = −0.0424 | |

Figure 54:
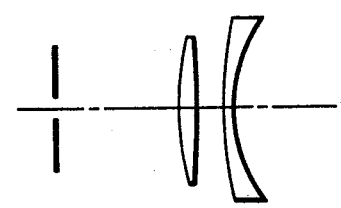

Nineteenth Embodiment (FIG. 54)

$\phi_0 = 15°$, $f = 300$, $F_{NO} = 60$, (V = −0.5492), $\omega/2 = 24.7°$, E = 0.8233

$r_1 = 80.0701$, $d_0 = 38.8722$
$r_2 = -2365.5316$, $d_1 = 6.0947$, $n_1 = 1.77591$
$r_3 = 166.3436$, $d_2 = 9.1968$
$r_4 = 51.5021$, $d_3 = 2.9444$, $n_2 = 1.59303$

| | 100 | e | $\beta_{01}$ | I = 22.6696, | P = 0.1953 |
|---|---|---|---|---|---|
| 1st Part System | 3.0023 | 0.0507 | −0.3402 | II = −0.5299, | V = −0.3566 |
| 2nd Part System | −2.3622 | | −3.9172 | III = 0.0213 | |

Figure 55:
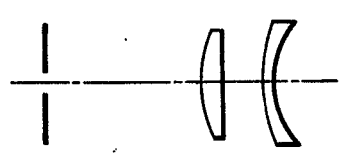

Twentieth Embodiment (FIG. 55)

$\phi_0 = 10°$, $f = 300$, $F_{NO} = 60$, (V = −2.069), $\omega/2 = 13.98°$, E = 0.699

$r_1 = 41.1079$, $d_0 = 51.4077$
$r_2 = 677.6539$, $d_1 = 6.2992$, $n_1 = 1.50992$
$r_3 = 63.4573$, $d_2 = 14.2564$
$r_4 = 31.9654$, $d_3 = 2.7902$, $n_2 = 1.75365$

| | $\psi$ | e | $\beta_{01}$ | I = 75.4906, | P = 0.3135 |
|---|---|---|---|---|---|
| 1st Part System | 3.5079 | 0.0734 | 0.5093 | II = 10.233, | V = −1.6758 |
| 2nd Part System | −3.3771 | | −4.4417 | III = 0.0963 | |

Figure 56:
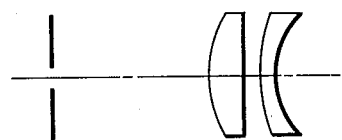

Twenty-first Embodiment (FIG. 56)

$\phi_0 = 10°$, $f = 300$, $F_{NO} = 60$, (V = −2.069), $\omega/2 = 13.92°$, E = 0.696

$r_1 = 36.6945$, $d_0 = 51.4783$
$r_2 = 549.8864$, $d_1 = 11.5492$, $n_1 = 1.51571$
$r_3 = 58.7575$, $d_2 = 6.2811$
$r_4 = 28.2295$, $d_3 = 4.6865$, $n_2 = 1.78001$

| | $\psi$ | e | $\beta_{01}$ | I = 100.0156, | P = 0.1765 |
|---|---|---|---|---|---|
| 1st Part System | 3.9648 | 0.0661 | 0.5094 | II = 13.0392, | V=0 −1.843 |
| 2nd Part System | −4.0168 | | −4.1336 | III = 0.0189 | |

Figure 57A:
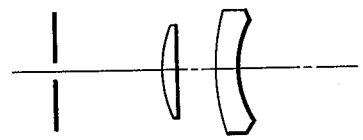
Figure 57B:
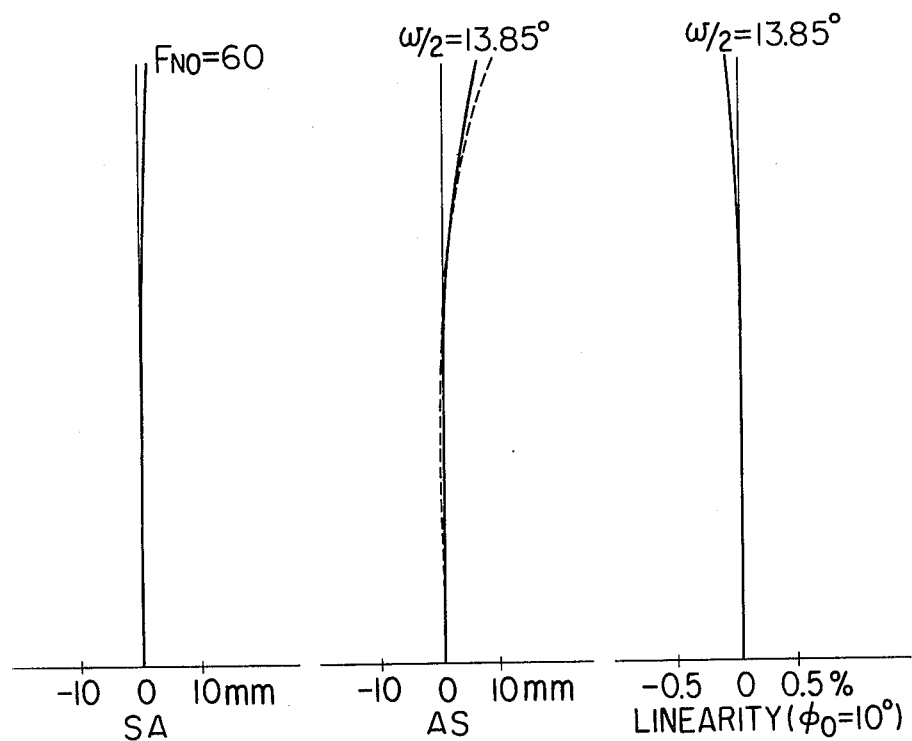
FIG. 57(B) illustrates various aberrations in the lens of FIG. 57(A).

Twenty-second Embodiment (FIG. 57A, aberrations in FIG. 57B)

$\phi_0 = 10°$, $f = 300$, $F_{NO} = 60$, (V = −2.069), $\omega/2 = 13.85°$, E = 0.6925

$r_1 = 37.2432$, $d_0 = 35.7165$
$r_2 = 374.3453$, $d_1 = 4.7222$, $n_1 = 1.53625$
$r_3 = 66.7667$, $d_2 = 13.8068$
$r_4 = 29.2251$, $d_3 = 6.5243$, $n_2 = 1.79747$

| | $\psi$ | e | $\beta_{01}$ | I = 110.0997, | P = 0.0288 |
|---|---|---|---|---|---|
| 1st Part System | 3.9082 | 0.0807 | 0.554 | II = 13.0624, | V = −2.0409 |
| 2nd Part System | −4.2473 | | −3.7732 | III = 0.1157 | |

Figure 58:
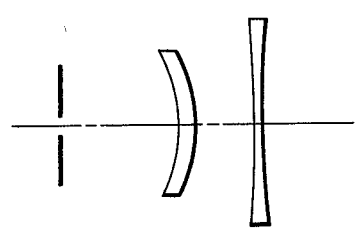

Twenty-third Embodiment (FIG. 58)

$\phi_0 = 20°$, $f = 300$, $F_{NO} = 60$, (V = −0.01725), $\omega/2 = 26.62°$, E = 0.6655

$r_1 = -64.145$, $d_0 = 38.0464$
$r_2 = -47.7024$, $d_1 = 4.822$, $n_1 = 1.7702$
$r_3 = -900.3147$, $d_2 = 20.8087$
$r_4 = 589.4055$, $d_3 = 3.0003$, $n_2 = 1.51037$

| | $\phi$ | e | $\beta_{01}$ | I = 136.7139, | P = 0.4168 |
|---|---|---|---|---|---|
| 1st Part System | 1.4 | 0.05 | −8.193 | II = 5.0768, | V = 0.0415 |

-continued

| | | | | |
|---|---|---|---|---|
| 2nd Part System | −0.4301 | | −1.6709 III= −0.1772 | |

Figure 59:
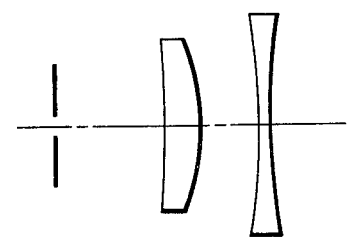

Twenty-fourth Embodiment (FIG. 59)

$\phi_0 = 20°$    (V = −0.01725)
$f = 300$, $F_{NO} = 60$,    $\omega/2$   26.37°, E = 0.6593
$r_1 = -365.4645$,   $d_0 = 38.8355$
$r_2 = -84.5915$,    $d_1 = 9.3452$,    $n_1 = 1.77993$
$r_3 = -240.7925$,   $d_2 = 20.1568$
$r_4 = 214.5115$,    $d_3 = 4.5897$,    $n_2 = 1.51001$

| | $\psi$ | e | $\beta_{01}$ | I= 65.3646, | P= 0.3011 |
|---|---|---|---|---|---|
| 1st Part System | 2.1567 | 0.0673 | −2.8853 | II= 0.03943, | V= −0.0183 |
| 2nd Part System | −1.3533 | | −1.4252 | III= 0.03021 | |

Figure 60:
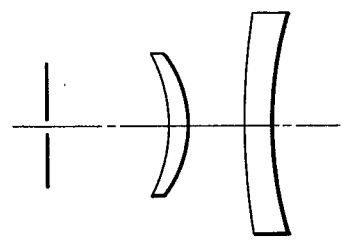

Twenty-fifth Embodiment (FIG. 60)

$\phi_0 = 15°$    (V = −0.5492)
$f = 300$, $F_{NO} = 60$,    $\omega/2 = 25.19°$, E = 0.8397
$r_1 = -53.5753$,    $d_0 = 40.161$
$r_2 = -40.0577$,    $d_1 = 5.9256$,    $n_1 = 1.77995$
$r_3 = 262.0222$,    $d_2 = 20.349$
$r_4 = 105.0852$,    $d_3 = 7.3101$,    $n_2 = 1.51027$

| | $\psi$ | e | $\beta_{01}$ | I= 259.8556, | P= 0.2503 |
|---|---|---|---|---|---|
| 1st Part System | 1.7767 | 0.0676 | −8.2162 | II= 16.0775, | V= −0.3657 |
| 2nd Part System | −0.8587 | | −5.1409 | III= −0.0812 | |

Figure 61:
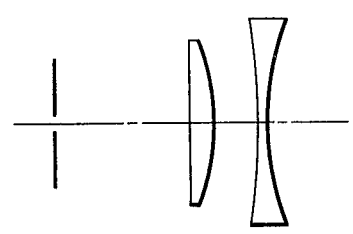

Twenty-sixth Embodiment (FIG. 61)

$\phi_0 = 15°$    (V = −0.5492)
$f = 300$, $F_{NO} = 60$,    $\omega/2 = 25.04°$, E = 0.8347
$r_1 = -516.6602$,   $d_0 = 46.569$
$r_2 = -68.4463$,    $d_1 = 6.9867$,    $n_1 = 1.78012$
$r_3 = -212.2551$,   $d_2 = 14.855$
$r_4 = 94.6513$,    $d_3 = 2.9906$,    $n_2 = 1.51162$

| | $\psi$ | e | $\beta_{01}$ | I= 142.5261, | P= 0.1152 |
|---|---|---|---|---|---|
| 1st Part System | 2.9866 | 0.0521 | −2.5876 | II= 7.352, | V= −0.4 |
| 2nd Part System | −2.3525 | | −1.953 | III= −0.07561 | |

Figure 62A:
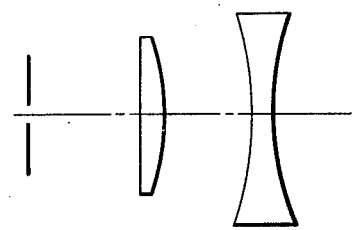
Figure 62B:
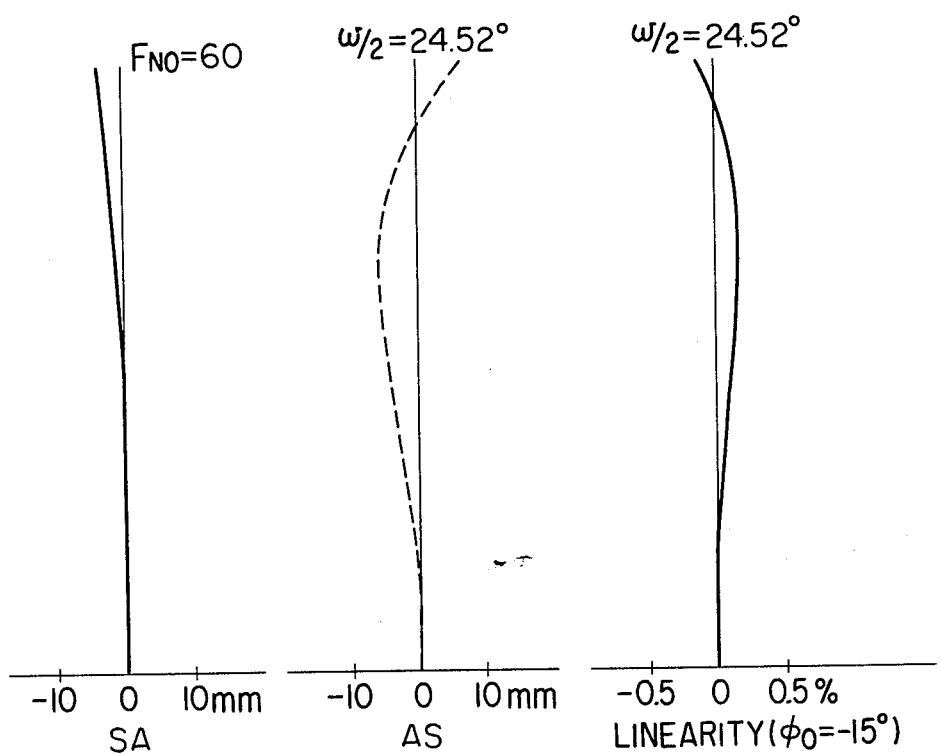
FIG. 62(B) illustrates various aberrations in the lens of FIG. 62(A).

Twenty-seventh Embodiment (FIG. 62A, aberrations in FIG. 62B)

$\phi_0 = 15°$    (V = 0.5492)
$f = 300$, $F_{NO} = 60$,    $\omega/2 = 24.52°$, E = 0.8173
$r_1 = -1481.9153$,  $d_0 = 38.0105$
$r_2 = -77.8135$,    $d_1 = 6.2935$,    $n_1 = 1.78894$
$r_3 = -117.4756$,   $d_2 = 30.3176$,
$r_4 = 115.3665$,    $d_3 = 8.1318$,    $n_2 = 1.52864$

| | $\psi$ | e | $\beta_{01}$ | I= 101.8037, | P= −0.1714 |
|---|---|---|---|---|---|
| 1st Part System | 2.8876 | 0.1093 | −2.377 | II= −0.4863, | V= −0.5913 |
| 2nd Part System | −2.7575 | | −1.3413 | III= 0.3017 | |

Figure 63:
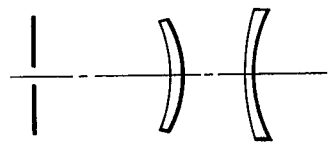

Twenty-eighth Embodiment (FIG. 63)

$\phi_0 = 10°$    (V = −2.069)
$f = 300$, $F_{NO} = 60$,    $\omega/2 = 14.07°$, E = 0.7035
$r_1 = 59.8531$,    $d_0 = 45.8073$
$r_2 = -36.0662$,    $d_1 = 4.2633$,    $n_1 = 1.77986$
$r_3 = 107.9603$,    $d_2 = 22.1727$
$r_4 = 52.73925$,    $d_3 = 2.4633$,    $n_2 = 1.77997$

| | $\psi$ | e | $\beta_{01}$ | I= 497.9507, | P= 0.1735 |
|---|---|---|---|---|---|
| 1st Part System | 2.78 | 0.0719 | −5.3189 | II= 39.3663, | V= −1.6676 |
| 2nd Part System | −2.246 | | −4.1945 | III= −0.0223 | |

Figure 64:
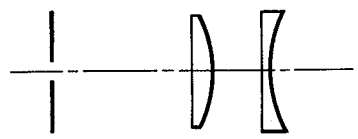

Twenty-ninth Embodiment (FIG. 64)

$\phi_0 = 10°$    (V = −2.069)
$f = 300$, $F_{NO} = 60$,    $\omega/2 = 13.98°$, E = 0.699
$r_1 = -817.8804$,   $d_0 = 48.0267$
$r_2 = -47.5003$,    $d_1 = 5.1456$,    $n_1 = 1.67065$
$r_3 = 281.3072$,    $d_2 = 17.3088$
$r_4 = 47.9605$,    $d_3 = 2.9255$,    $n_2 = 1.78024$

| | $\psi$ | e | $\beta_{01}$ | I= 412.8724, | P= 0.114 |
|---|---|---|---|---|---|
| 1st Part System | 3.9995 | 0.0637 | −2.6381 | II= 32.6302, | V= −1.859 |
| 2nd Part System | −4.0253 | | −2.6931 | III= −0.012 | |

Figure 65:
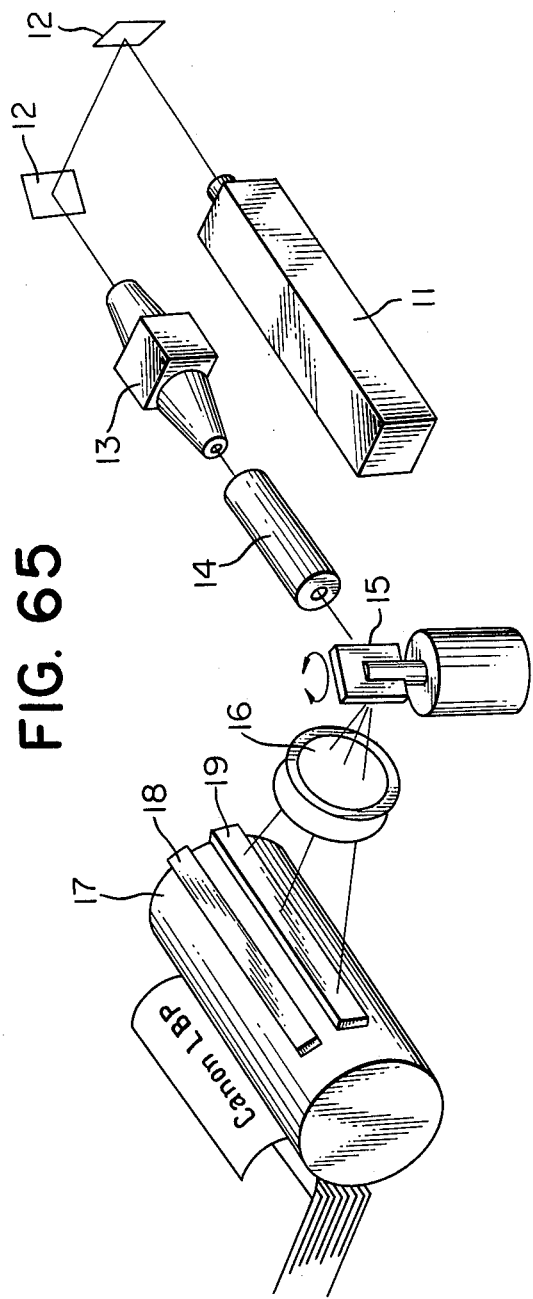
FIGS. 65 and 66 schematically show applications of the scanning optical system of the present invention to the information processing terminal unit.

FIG. 65 is a perspective view of the laser beam printer to which the scanning device of the present invention is applied. In FIG. 65, the laser beam oscillated from a laser oscillator 11 is directed via a mirror 12 to the inlet opening of a modulator 13. The beam modulated in the modulator 13 by information signals to be recorded has its beam diameter expanded by a beam expander 14 while it remains to be a parallel beam, and then enters a vibratory mirror 15 vibrated in a sine form. The beam deflected by the vibratory mirror 15 is focused upon a photosensitive drum 17 by a focusing lens 16. Therefore, the beam deflected by a vibratory mirror 15 scans over the photosensitive drum 17 at a uniform velocity. Designated by 18 and 19 are a first corona charger and an AC corona discharger, respectively, both of which form part of the electrophotographic process.

Figure 66:
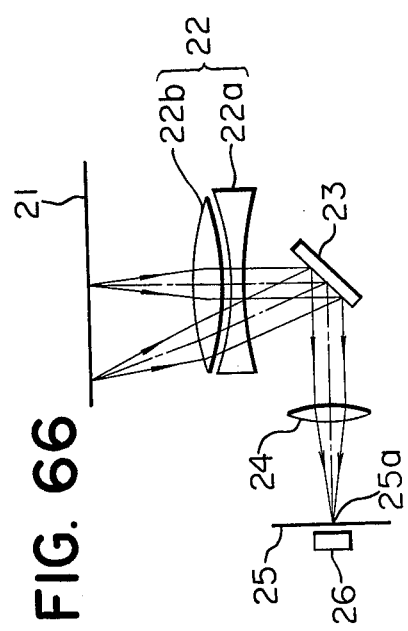

FIG. 66 shows an example of the reader apparatus to which the scanning device of the present invention is applied. This is an apparatus of the type which reads the light beam from an unshown conventional extraneous illumination source as it is reflected by a scanned surface. Designated by 21 is the scanned surface, and 22 a focusing lens such as the above-described one which is of the type having a negative lens 22a on the deflector side and a positive lens 22b on the scanned surface side. Denoted by 23 is a deflector vibrated in a sine form, 24 a condenser lens, 25 a slit plate having a slit 25a, and 26 a photoelectric conversion element. Thus, the beam from the scanned surface 21 is passed through the focusing lens 22 and deflected by the sine form vibration deflector 23, whereafter the beam is focused upon the slit plate 25 by the condenser lens 24 and detected by the photoelectric conversion element 26 through the slit 25a. When this occurs, the points to be read on the scanned surface 21 are scanned at a uniform velocity even if the deflector 23 effects sine form vibration.

What we claim is:

1. A scanning optical system comprising:
   deflecting mirror means for providing a scanning operation with a scanning beam;

driving means for driving said deflecting mirror means to vibrate it so that its rotational angle $\phi$ is equal to $\phi_0 \sin K_1 t$;

a light source for generating an afocal beam toward said deflecting mirror means; and focusing lens means, disposed between said deflecting mirror means and a surface to be scanned as having an optical axis passing through the center of said deflecting mirror means, for imaging the beam on the surface to be scanned in a form of spot, said focusing lens means having a distortion characteristic represented by $$y' = 2\phi_0 f \arcsin(\theta/2\phi_0),$$

wherein $y'$ is the distance measured on the surface to be scanned between the optical axis of said focusing lens and the spot formed on the surface, and $\theta$ is the angle formed between the scanning beam directed toward the entrance side nodal point of said focusing lens means and the optical axis of said focusing lens means.

2. A scanning optical system according to claim 1, wherein said focusing lens means has two partial systems spaced apart from each other by a limited distance, each of said partial systems comprising a single lens.

3. A scanning optical system according to claim 1, wherein said focusing lens means has two partial systems spaced apart from each other by a limited distance, each of said partial systems comprising a doublet lens.

4. A scanning optical system according to claim 1, wherein said focusing lens means has a first partial system disposed toward said deflector and having a negative refractive power, and a second partial system disposed toward said scanned surface and having a positive refractive power.

5. A scanning optical system according to claim 4, wherein said first and second system includes respective lenses having the refractive indices $N_1$ and $N_2$, respectively, and when the focal length of said focusing lens is 1, $1.46 \leq N_1 \leq 1.84$ and $1.46 \leq N_2 \leq 1.84$, said focusing lens satisfies the following conditions:

$$-5.5 \leq \psi_1 \leq -0.35$$

$$1.2 \leq \psi_2 \leq 5.7$$

$$-10 \leq B_{01} \leq 3$$

where $\psi_1$: the refractive power of said first partial system when the focal length of said lens is 1;

$\psi_2$: the refractive power of said second partial system when the focal length of said lens is 1;

$B_{01}$: the intrinsic coefficient of said first partial system defined by $$-\frac{N_1}{N_1 - 1} + \frac{N_1 + 1}{N_1}\left(\frac{1}{R}\right),$$

where $R_1$ is the radius of curvature of that surface of the lens of the first partial system which is nearer to said light source.

6. A scanning optical system according to claim 1 wherein there are the following relations between the distortion characteristics to be possessed by said focusing lens and the maximum angle of deviation $\phi_0$ of said mirror:

$$V = 2/3 (1 - 1/2k^2)$$

$$\hat{V} = 8(1/6k^2 - 3/40k^4 - 1/5)$$

where V is third-order distortion factor, $\hat{V}$ is fifth-order distortion factor, and $k \equiv 2\phi_0$.

7. A scanning optical system according to claim 1, wherein said focusing lens means has a first partial system disposed toward said deflector and having a positive refractive power, and a second partial system disposed toward said scanned surface and having a negative refractive power.

8. A scanning optical system according to claim 7, wherein said first and second system includes respective lenses having the refractive indices $N_1$ and $N_2$, respectively, and when the focal length of said focusing lens is 1, $1.46 \leq N_1 \leq 1.84$ and $1.46 \leq N_2 \leq 1.84$, said focusing lens satisfies the following conditions:

$$1.35 \leq \psi_1 \leq 5.5$$

$$-5.3 \leq \psi_2 \leq -0.4$$

$$-13 \leq B_{01} \leq 4$$

where $\psi_1$: the refractive power of said first partial system when the focal length of said lens is 1;

$\psi_2$: the refractive power of said second partial system when the focal length of said lens is 1; and $B_{01}$: the intrinsic coefficient of said first partial system defined by $$-\frac{N_1}{N_1 - 1} + \frac{N_1 + 1}{N_1}\left(\frac{1}{R_1}\right),$$

where $R_1$ is the radius of curvature of that surface of the lens of the first partial system which is nearer to said light source.

9. A scanning optical system comprising:

deflecting mirror means for providing a scanning operation with a scanning beam;

driving means for driving said deflecting mirror means to vibrate it so that its rotational angle $\phi$ is equal to $\phi_0 \sin K_1 t$;

a light source, disposed at a distance $r$ from the center of said mirror means, for generating a beam toward said deflecting mirror means; and focusing lens means, disposed between said deflecting mirror means and a surface to be scanned and having an optical axis passing through the center of said deflecting mirror means, for imaging the beam on the surface to be scanned in a form of spot, said focusing lens means having a distortion characteristic represented by $$y' = \frac{fr\phi_o}{r + l} \int F(\theta)d\theta$$

where $y'$ is the distance measured on the surface to be scanned between the optical axis of said focusing lens means and the spot formed on the surface, $l$ is the distance between the center of said deflecting mirror means and the nodal point of said focusing lens means on the entrance side thereof, and $F(\theta)$ is $$\frac{l^2 + r^2 + 2l \cdot f(\theta)}{\{r + l \cdot f(\theta)\} \sqrt{\phi_o^2 - \left[\arccos\left(\frac{1}{r} f(\theta)\right)\right]^2}}$$

where $f(\theta)$ is $r^2\cos^2\theta - l^2\sin^2\theta - l\sin^2\theta$, and $\theta$ is the angle formed between the scanning beam directed toward the entrance side nodal point of said focusing lens means and the optical axis of said focusing lens means.

* * * * *

UNITED STATES PATENT AND TRADEMARK OFFICE
CERTIFICATE OF CORRECTION

PATENT NO. : 4,108,532
DATED : August 22, 1978
INVENTOR(S) : KAZUO MINOURA

It is certified that error appears in the above–identified patent and that said Letters Patent are hereby corrected as shown below:

Column 5, line 3, delete "$\omega$".

Column 6, Table 1, first column, change "A" to --$\overset{\circ}{A}$--;

Column 6, Table 3, under Heading "Aberration Coefficients" at the line under "$II_p$" delete "$\Lambda$" and insert --$\underset{I}{\Lambda}$--.

Column 10, in equation "(30)" change "20" to --2--.

Column 21, under Heading "Twenty-eighth Embodiment (FIG. 63)", 3rd line, first column, after "$r_1 =$" insert a -- - --.

Signed and Sealed this

Sixth Day of November 1979

[SEAL]

Attest:

RUTH C. MASON
Attesting Officer

LUTRELLE F. PARKER
Acting Commissioner of Patents and Trademarks